United States Patent
Holmes et al.

(10) Patent No.: US 12,287,447 B2
(45) Date of Patent: Apr. 29, 2025

(54) SYNTHESIS OF MULTIPLE BOUNDARY LOCATION SCENARIOS FOR WELLS

(71) Applicant: Chevron U.S.A. Inc., San Ramon, CA (US)

(72) Inventors: Robert Chadwick Holmes, Houston, TX (US); Fabien Jean Nicolas Laugier, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 347 days.

(21) Appl. No.: 17/866,135

(22) Filed: Jul. 15, 2022

(65) Prior Publication Data

US 2024/0019600 A1    Jan. 18, 2024

(51) Int. Cl.
*G01V 3/34* (2006.01)
*E21B 43/30* (2006.01)

(52) U.S. Cl.
CPC .............. *G01V 3/34* (2013.01); *E21B 43/30* (2013.01)

(58) Field of Classification Search
CPC ... G01V 3/34; G01V 3/36; G01V 3/38; E21B 43/30; E21B 2200/20
See application file for complete search history.

(56) References Cited

U.S. PATENT DOCUMENTS

| | | | |
|---|---|---|---|
| 7,126,340 B1 | 10/2006 | Ameen | |
| 9,279,323 B2* | 3/2016 | Mullins | G01V 3/30 |
| 10,459,098 B2 | 10/2019 | Grant | |
| 2007/0027666 A1 | 2/2007 | Frankel | |
| 2007/0168133 A1 | 7/2007 | Bennett | |
| 2012/0253770 A1 | 10/2012 | Stern | |
| 2013/0261978 A1 | 10/2013 | Xu | |
| 2014/0236549 A1 | 8/2014 | Le Ravalec | |
| 2015/0035536 A1 | 2/2015 | Tang | |
| 2018/0225778 A1 | 8/2018 | Grant | |

(Continued)

FOREIGN PATENT DOCUMENTS

| | | |
|---|---|---|
| CN | 105389467 | 3/2016 |
| CN | 114880825 | 8/2022 |

(Continued)

OTHER PUBLICATIONS

Zhou et al. A Stratigraphic Prediction Method Based on Machine Learning. Applied Sciences [online], pp. 1-29, Aug. 29, 2019 [retrieved on Jan. 10, 2022]. Retrieved from the Internet: <URL:https://www.mdpi.com/2076-3417/9/17/3553/pdf>, especially pp. 1-29. entire document.

(Continued)

*Primary Examiner* — Manuel L Barbee
(74) *Attorney, Agent, or Firm* — Esplin & Associates, PC

(57) ABSTRACT

A group of wells may be located within a region of interest. Multiple scenarios of boundary locations within the group of wells may be obtained. Boundary likelihood curves for the wells may be generated. Different number and/or locations of boundaries within different scenarios of boundary locations may be synthetized into the boundary likelihood curves. A visual representation of the boundary likelihood curves may be generated. The visual representation of the boundary likelihood curves may be used to automatically select and/or guide manual selection of boundary locations in the region of interest.

20 Claims, 16 Drawing Sheets

(56) References Cited

U.S. PATENT DOCUMENTS

| | | | |
|---|---|---|---|
| 2020/0356856 A1 | 11/2020 | Moniruzzaman | |
| 2021/0048556 A1 | 2/2021 | Sun | |
| 2021/0208302 A1* | 7/2021 | Ma | G01V 3/28 |
| 2022/0120930 A1* | 4/2022 | Kiselev | E21B 49/00 |
| 2023/0351079 A1 | 11/2023 | Holmes | |
| 2023/0366309 A1* | 11/2023 | Holmes | E21B 49/00 |
| 2023/0399934 A1 | 12/2023 | Holmes | |
| 2024/0061146 A1 | 2/2024 | Holmes | |

FOREIGN PATENT DOCUMENTS

| | | |
|---|---|---|
| WO | 2017135972 | 8/2017 |
| WO | 2018164680 | 9/2018 |
| WO | 2020185918 | 9/2020 |

OTHER PUBLICATIONS

PCT International Search Report and Written Opinion for PCT Application No. PCT/US2021/058730, mailed Feb. 7, 2022 (8 pages).

PCT International Search Report for Application No. PCT/US2021/058823, mailed Feb. 2, 2022 (8 pages).

PCT International Search Report and Written Opinion for PCT Application No. PCT/US2021/058835, mailed Feb. 4, 2022 (17 pages).

AU Examination Report from AU Application No. 2021377807 mailed Sep. 1, 2023 (3 pages).

AU Examination Report from AU Application No. 2021379607, mailed Aug. 31, 2023 (3 pages).

AU Examination Report from AU Application No. 2021380731 mailed Sep. 4, 2023 (4 pages).

Florent Lallier et al: "Uncertainty assessment in the stratigraphic well correlation of a carbonate ramp: Method and application to the Beausset Basin, SE France", Comptes Rendus Geoscience, Elsevier, Paris, FR, vol. 348, No. 7, Jan. 25, 2016 (Jan. 25, 2016), pp. 499-509, XP029757193.

I. Le Nir et al: "Cross-Section Construction From Automated Well Log Correlation: A Dynamic Programming Approach Using Multiple Well Logs", SPWLA 39th Annual Logging Symposium, May 1, 1998 (May 1, 1998), XP055327733, Retrieved from the Internet: URL:https://www.onepetro.org/download/conference-paper/SPWLA-1998-DDDid=conferencepaper/SPWLA-1998-DDD[retrieved on Dec. 9, 2016].

Madof Andrew S. et al: "Stratigraphic aliasing and the transient nature of deep-water depositional sequences: Revisiting the Mississippi Fan", Geology, vol. 47, No. 6, Apr. 16, 2019 (Apr. 16, 2019) pp. 545-549, XP093179240.

PCT International Search Report and Written Opinion for PCT Application No. PCT/US2021/058819, mailed Feb. 7, 2022 (9 pages).

* cited by examiner

SYNTHESIS OF MULTIPLE BOUNDARY LOCATION SCENARIOS FOR WELLS

FIELD

The present disclosure relates generally to the field of combining multiple scenarios of well boundary locations into a boundary likelihood curve.

BACKGROUND

Correlation of different wells using well logs may provide insights on whether and/or how different segments of the wells are linked together. Correlation of wells may be highly dependent on the well that is used as the source well from which boundaries are identified in other wells. Selection of different wells as the source well may result in different scenarios of boundary locations within the wells. Manually considering, curating, and/or integrating multiple scenarios of boundaries locations may be difficult, time-consuming, and subject to bias of the analyst.

SUMMARY

This disclosure relates to combining multiple scenarios of well boundary locations. Well information, boundary information, and/or other information may be obtained. The well information may define a group of wells within a region of interest. The group of wells may include multiple wells. The boundary information may define scenarios of boundary locations within the group of wells. The scenarios of boundary locations may include a first scenario of boundary locations in which a well includes a first set of boundaries in a first set of locations, a second scenario of boundary locations in which the well includes a second set of boundaries in a second set of locations, and/or other scenarios of boundary locations. One or more boundary likelihood curves for one or more of the multiple wells within the group of wells may be generated based on the scenarios of boundary locations for the well(s) and/or other information. One or more visual representations of the boundary likelihood curve(s) for the well(s) may be generated.

A system for combining multiple scenarios of well boundary locations may include one or more electronic storage, one or more processors and/or other components. The electronic storage may store well information, information relating to wells, information relating to a group of wells, boundary information, information relating to scenarios of boundary locations, information relating to boundary likelihood curves, information relating to visual representations of boundary likelihood curves, and/or other information.

The processor(s) may be configured by machine-readable instructions. Executing the machine-readable instructions may cause the processor(s) to facilitate combining multiple scenarios of well boundary locations. The machine-readable instructions may include one or more computer program components. The computer program components may include one or more of a well information component, a boundary information component, a boundary likelihood curve component, a visual representation component, and/or other computer program components.

The well information component may be configured to obtain well information and/or other information. The well information may define a group of wells within a region of interest. The group of wells may include multiple wells. In some implementations, the group of wells may include a pseudo well representative of the region of interest.

The boundary information component may be configured to obtain boundary information and/or other information. The boundary information may define scenarios of boundary locations within the group of wells. The scenarios of boundary locations may include a first scenario of boundary locations in which a well includes a first set of boundaries in a first set of locations, a second scenario of boundary locations in which the well includes a second set of boundaries in a second set of locations, and/or other scenarios of boundary locations.

In some implementations, the first scenario of boundary locations and the second scenario of boundary locations may include different numbers of boundaries. The first scenario of boundary locations and the second scenario of boundary locations may include different locations of boundaries.

In some implementations, individual scenarios of boundary locations within the group of wells may be determined based on propagation of boundaries of a single well in the group of wells to other wells in the group of wells and/or other information.

The boundary likelihood curve component may be configured to generate one or more boundary likelihood curves for one or more of the multiple wells within the group of wells. The boundary likelihood curves for a well may be generated based on the scenarios of boundary locations for the well and/or other information. In some implementations, different numbers of boundaries and/or different locations of boundaries from multiple scenarios of boundary locations for a well may be synthetized into a boundary likelihood curve for the well.

In some implementations, a boundary likelihood curve may be a kernel density curve. A kernel density curve may be a weighted kernel density curve. A kernel density curve may be an un-weighted kernel density curve.

In some implementations, locations of boundaries within the region of interest may be automatically selected or automatically adjusted based on the boundary likelihood curve and/or other information.

The visual representation component may be configured to generate one or more visual representations of the boundary likelihood curve(s) for the well(s). In some implementations, a visual representation of a boundary likelihood curve for a well may include separate visualization of a weighted boundary likelihood curve and an un-weighted boundary likelihood curve for the well.

In some implementations, the visual representation(s) of the boundary likelihood curve(s) for the well(s) may be presented on one or more displays. The visual representation(s) of the boundary likelihood curve(s) for the well(s) may be presented to guide user selection or user adjustment of locations of boundaries within the region of interest.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form

DETAILED DESCRIPTION

The present disclosure relates to combining multiple scenarios of well boundary locations. A group of wells may be located within a region of interest. Multiple scenarios of boundary locations within the group of wells may be obtained. Boundary likelihood curves for the wells may be generated. Different number and/or locations of boundaries within different scenarios of boundary locations may be synthetized into the boundary likelihood curves. A visual representation of the boundary likelihood curves may be generated. The visual representation of the boundary likelihood curves may be used to automatically select and/or guide manual selection of boundary locations in the region of interest.

Figure 1:
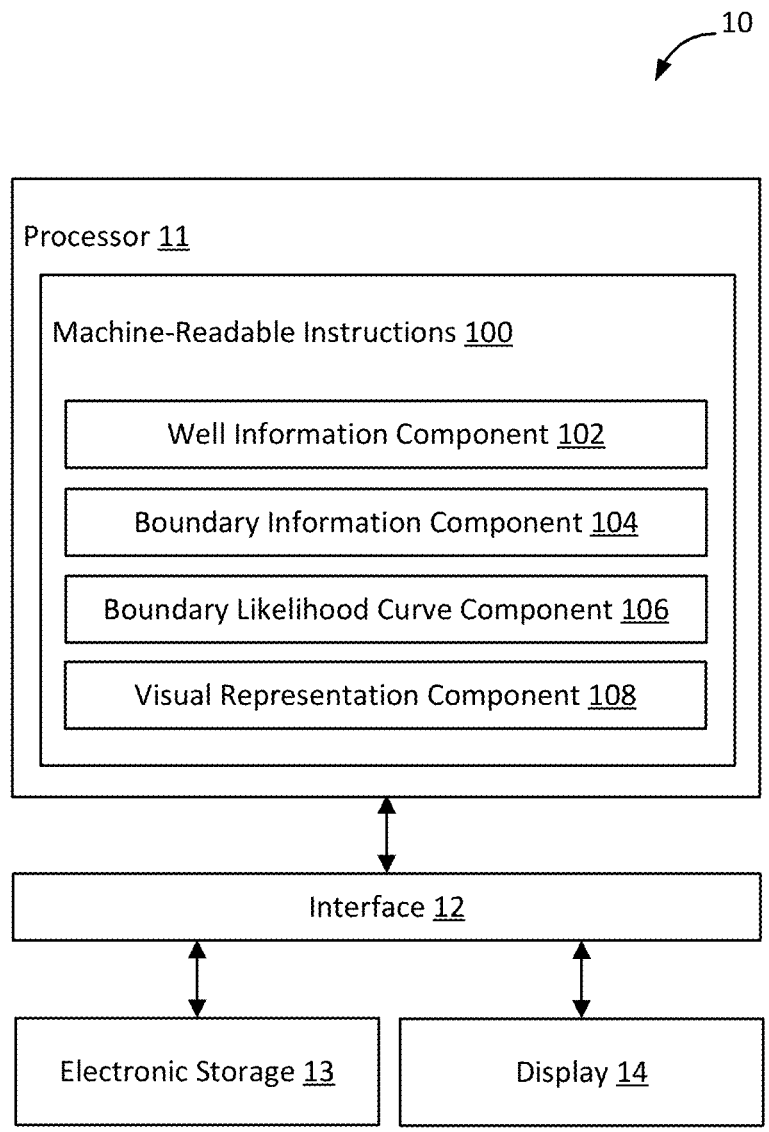
FIG. 1 illustrates an example system for combining multiple scenarios of well boundary locations.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a display 14, and/or other components. Well information, boundary information, and/or other information may be obtained by the processor 11. The well information may define a group of wells within a region of interest. The group of wells may include multiple wells. The boundary information may define scenarios of boundary locations within the group of wells. The scenarios of boundary locations may include a first scenario of boundary locations in which a well includes a first set of boundaries in a first set of locations, a second scenario of boundary locations in which the well includes a second set of boundaries in a second set of locations, and/or other scenarios of boundary locations. One or more boundary likelihood curves for one or more of the multiple wells within the group of wells may be generated by the processor 11 based on the scenarios of boundary locations for the well(s) and/or other information. One or more visual representations of the boundary likelihood curve(s) for the well(s) may be generated by the processor 11.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store reference well information, information relating to wells, information relating to a group of wells, boundary information, information relating to scenarios of boundary locations, information relating to boundary likelihood curves, information relating to visual representations of boundary likelihood curves, and/or other information.

The display 14 may refer to an electronic device that provides visual presentation of information. The display 14 may include a color display and/or a non-color display. The display 14 may be configured to visually present information. The display 14 may present information using/within one or more graphical user interfaces. For example, the display 14 may present well information, information relating to wells, information relating to a group of wells, boundary information, information relating to scenarios of boundary locations, information relating to boundary likelihood curves, information relating to visual representations of boundary likelihood curves, and/or other information.

A key step in analyzing a subsurface region is the stratigraphic correlation of wells (spatial linkage of patterns across wells) within the subsurface region. Well log data from the subsurface region may be used to separate and/or relate subsurface segments/packages in terms of stratigraphic successions at different scales (e.g., ranging from individual depositional events to major divisions in geologic time). Correlation techniques may utilize statistical analysis and/or pattern matching to find linkage between segments of different wells and identify locations of layer boundaries within the wells. Correlation between different wells may include correlation between real wells, correlation between virtual wells (e.g., computer-generated wells using one or more stratigraphic models), correlation between real wells and virtual wells, and/or correlation between other wells.

Correlation results may be highly dependent (biased) on the well that is used to start the pattern identification and matching process. For example, a subsurface region may include multiple wells, and one of the wells may be selected as a source well. Boundaries within the source well may be identified and propagated to other wells to determine correlation between the wells. Selection of different wells as the source well may result in different scenarios of boundary locations within the wells. For example, a subsurface region may include a thousand wells. Each of the wells may be used as a source well from which correlation among wells is established, with each well providing different scenario of boundary locations within the wells. A thousand wells within the subsurface region may lead to a thousand different scenarios of boundary locations within the wells. Different scenarios of boundary locations may be generated from a single source well by varying the path from the source well to other wells that establishes correlation between the different wells. Thus, comprehensive correlation of wells using different source wells may result in solution overload. Manually analyzing individual scenarios of boundary locations within the well may not be feasible, which may lead to uncertainty in accurate analysis of the subsurface region (e.g., create uncertainty in predicting reservoir properties at undrilled locations and/or for subsurface business decisions).

The present disclosure enables synthesis of multiple boundary location scenarios for wells. Different scenarios of boundary locations for a well are combined into a boundary likelihood curve for the well. A boundary likelihood curve for a well is generated by converting individual boundary locations from different boundary location scenarios into a probability value for the corresponding location (e.g., in space, in time) in the boundary likelihood curve. The boundary likelihood curve provides information on the importance of different locations (e.g., deposition time, depth) within the well. For example, a high value of the boundary likelihood curve may indicate that the corresponding location in the well was identified as a boundary location in many scenarios of boundary locations, while a low value of the boundary likelihood curve may indicate that the corresponding location in the well was not identified as a boundary location in many scenarios of boundary locations. Consistency in the values of the boundary likelihood curve over a range of locations (e.g., time range, depth range) may indicate homogeneity of subsurface properties over the range of locations, while variance in the in the values of the boundary likelihood curve over a range of locations may indicate heterogeneity of subsurface properties over the range of locations. The boundary likelihood curve for a well provides information on likelihood locations of boundaries within the well based on combination of multiple boundary location scenarios. The boundary likelihood curves for wells within a subsurface region provide guidance to an interpreter for establishing correlation between multiple wells.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate combining multiple scenarios of well boundary locations. The machine-readable instructions 100 may include one or more computer program components. The machine-readable instructions 100 may include a well information component 102, a boundary information component 104, a boundary likelihood curve component 106, a visual representation component 108, and/or other computer program components.

The well information component 102 may be configured to obtain well information and/or other information. Obtaining well information may include one or more of accessing, acquiring, analyzing, creating, determining, examining, generating, identifying, loading, locating, measuring, opening, receiving, retrieving, reviewing, selecting, storing, utilizing, and/or otherwise obtaining the well information. The well information component 102 may obtain well information from one or more locations. For example, the well information component 102 may obtain well information from a storage location, such as the electronic storage 13, electronic storage of a device accessible via a network, and/or other locations. The well information component 102 may obtain well information from one or more hardware components (e.g., a computing device, a component of a computing device) and/or one or more software components (e.g., software running on a computing device). Well information may be stored within a single file or multiple files. In some implementations, the well information may be obtained from one or more users. For example, a user may interact with a computing device to input, upload, identify, and/or select the well information to be obtained by the well information component 102.

Figure 3:
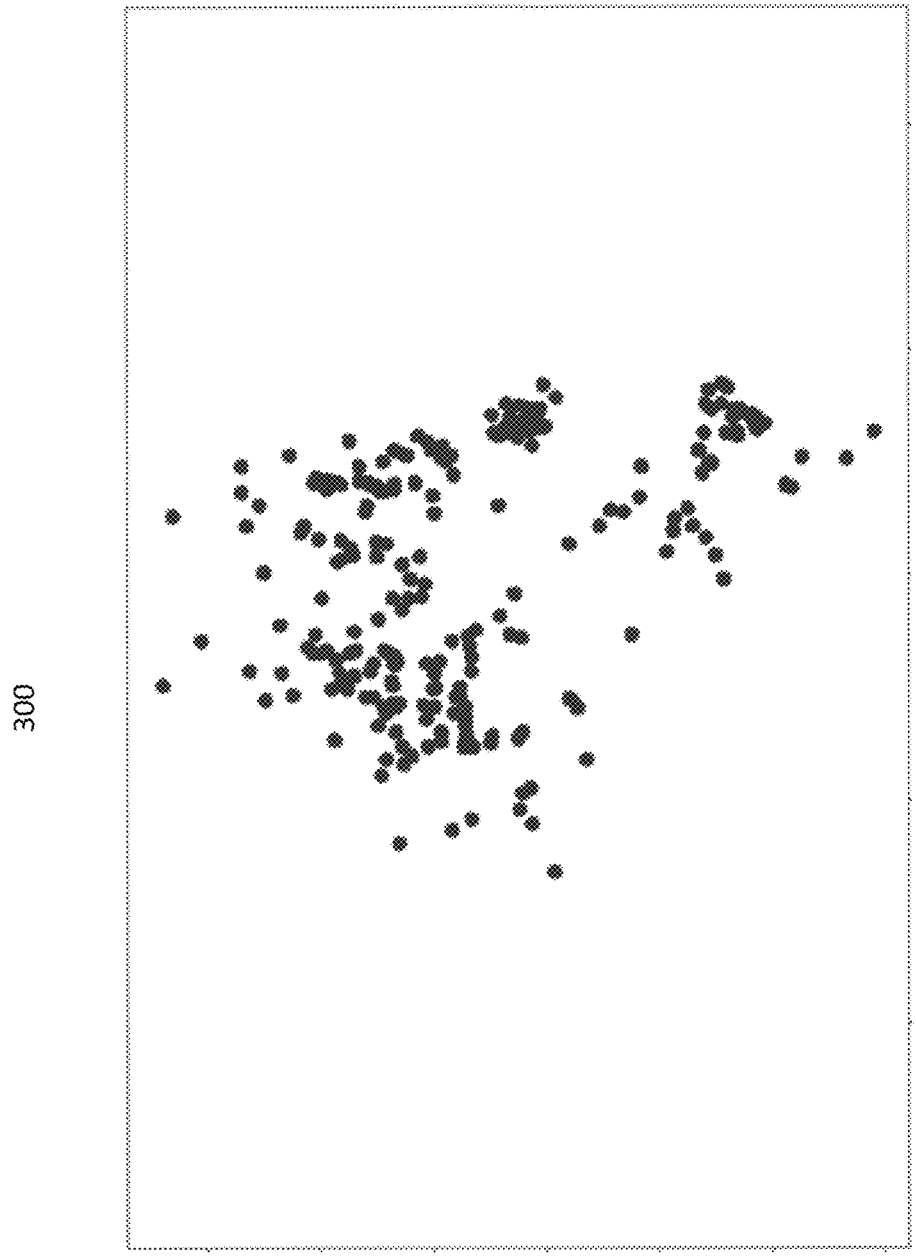
FIG. 3 illustrates an example group of wells.

The well information may define a group of wells within a region of interest. The well information may define a group of wells within a region of interest by describing, delineating, identifying, quantifying, and/or otherwise defining the group of wells within the region of interest. A region of interest may refer to a region of earth that is of interest, such as for correlating wells. For example, a region of interest may refer to a subsurface region (a part of earth located beneath the surface/located underground) for which well correlation is desired to be performed. A well may refer to a hole or a tunnel in the ground. A well may refer to a real well or a virtual well. A well may be drilled in one or more directions. A group of wells may include multiple wells. A group of wells may refer to wells that are located within the region of interest. A group of wells may refer to some or all of the wells that are located within the region of interest. In some implementations, a group of wells may include one or more wells that are representative of the region of interest. For example, a group of wells may include a pseudo well (e.g., type well) representative of the region of interest. The pseudo well may be generated to include subsurface properties/subsurface configuration that is reflective of the subsurface properties/subsurface configuration in the region of interest. FIG. 3 illustrates an example group of wells 300. Individual dots/circles in the group of wells 300 may represent a well in the region of interest.

The well information may define a group of wells by including information that describes, delineates, identifies, is associated with, quantifies, reflects, sets forth, and/or otherwise defines one or more of content, quality, attribute, feature, and/or other aspects of the group of wells. For example, the well information may define a well by including information that makes up the content of the well and/or information that is used to identify/determine the content of the wells. The well information may include time-series data.

The well information may define a group of wells by defining one or more characteristics of the group of wells. For example, the well information may define subsurface configuration of wells within a group of wells. Subsurface configuration of a well may refer to attribute, quality, and/or characteristics of the well. Subsurface configuration of a well may refer to type, property, and/or physical arrangement of materials (e.g., subsurface elements) within the well and/or surrounding the well. Examples of subsurface configuration may include types of subsurface materials, characteristics of subsurface materials, compositions of subsurface materials, arrangements/configurations of subsurface materials, physics of subsurface materials, and/or other subsurface configuration. For instance, subsurface configuration may include and/or define types, shapes, and/or properties of materials and/or layers that form subsurface (e.g., geological, petrophysical, geophysical, stratigraphic) structures. In some implementations, subsurface configuration of a well may be defined by values of one or more subsurface properties as a function of location (e.g., in space, in time) within the well. A subsurface property of a well may refer to a particular attribute, quality, and/or characteristics of the well.

In some implementations, the well information may include one or more well logs and/or associated information for the individual wells in the group of wells. The well information may include a single well log or a suite of well logs for individual wells in the group of wells. For instance, the well information may include one or more well logs (of natural well, of virtual well), information determined/extracted from one or more well logs (e.g., of natural well, or virtual well), information determined/extracted from one or more well cores (e.g., of natural well, or virtual well), and/or other information. The well logs may be related to reservoir properties, such as reservoir quality or presence. For example, the well information may include one or more well logs relating to one or more properties of a well, such as rock types, layers, grain sizes, porosity, and/or permeability of the well at different positions within the well. Other types of well information are contemplated.

Figure 4:
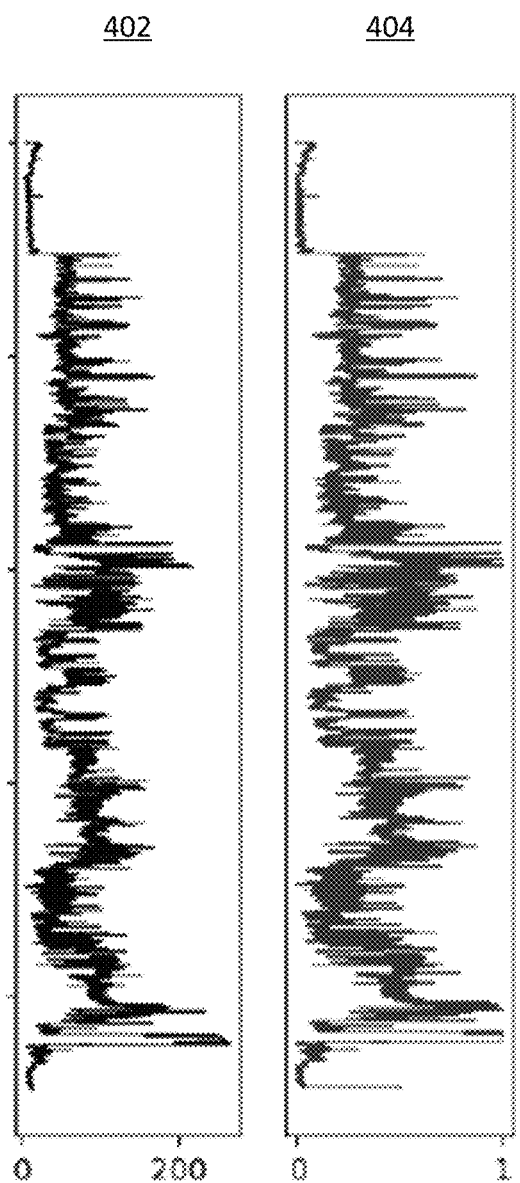
FIG. 4 illustrates an example normalization of a well log.

In some implementations, the well log(s) for the individual wells may be normalized based on a log scaling and/or other information. Individual well logs may be normalized to themselves. The type of normalization that is performed may depend on the scale of the well log. For example, linearly-scaled logs (e.g., gamma ray logs) may be normalized from value of zero to one based on threshold upper and lower quantiles. Non-linearly-scaled logs (e.g., deep resistivity logs) may be transformed/approximated to linear space, and then normalized from value of zero to one by the same/similar means. In some implementations, Gaussian transformation may be applied to a well log to change the distribution of values within a target interval. FIG. 4 illustrates an example normalization of a well log. In FIG. 4, original well log 402 may be transformed into a normalized well log 404 so that the values of the normalized well log 404 ranges between zero and one.

Figure 5:
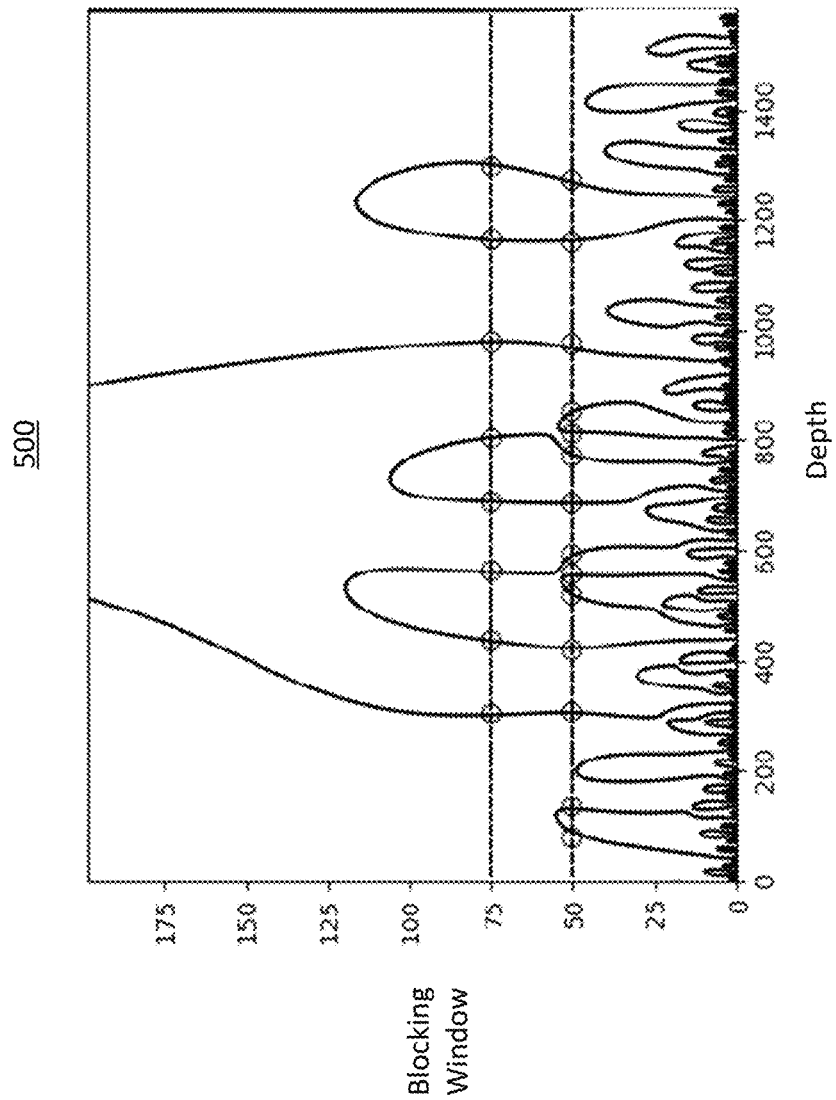
FIG. 5 illustrates an example Continuous Wavelet Transform plot for boundary identification.

Normalization of the well logs may prepare the well logs for Continuous Wavelet Transform (CWT). The CWT may be performed on the normalized well logs based on an array of blocking windows (operator widths), and/or other information. The widths and wavelet types used in CWT may be selected by a user. The CWT may generate a multi-dimensional array of results. The CWT may be used to identify boundaries within individual wells. FIG. 5 illustrates an example Continuous Wavelet Transform plot 500 for boundary identification. Identified boundaries are shown as circles in the Continuous Wavelet Transform plot 500. Continuous Wavelet Transform plot 500 may show how CWT groups parts of the well log into distinct/unique segments.

Different numbers and different locations of boundaries may be identified within a well/well log based on different sizes of blocking windows. For example, use of the value 75 for the blocking window may result in identification of 8 boundaries (plus a top and a base). Use of the value 50 for the blocking window may result in identification of 14 boundaries (plus a top and a base).

The boundary information component 104 may be configured to obtain boundary information and/or other information. Obtaining boundary information may include one or more of accessing, acquiring, analyzing, creating, determining, examining, generating, identifying, loading, locating, measuring, opening, receiving, retrieving, reviewing, selecting, storing, utilizing, and/or otherwise obtaining the boundary information. The boundary information component 104 may obtain boundary information from one or more locations. For example, the boundary information component 104 may obtain boundary information from a storage location, such as the electronic storage 13, electronic storage of a device accessible via a network, and/or other locations. The boundary information component 104 may obtain boundary information from one or more hardware components (e.g., a computing device, a component of a computing device) and/or one or more software components (e.g., software running on a computing device). Boundary information may be stored within a single file or multiple files. In some implementations, the boundary information may be obtained from one or more users. For example, a user may interact with a computing device to input, upload, identify, and/or select the boundary information to be obtained by the boundary information component 104.

The boundary information may define scenarios of boundary locations within the group of wells. The boundary information may define a scenario of boundary locations within the group of wells by describing, delineating, identifying, quantifying, and/or otherwise defining the scenario of boundary locations within the group of wells. A boundary within a well may refer to a feature and/or a place (e.g., in space, in time) within the well that separate two distinct segments/packages of the well. A boundary location may refer to location (e.g., in space, in time) of the boundary within the well. Boundary locations may be defined in terms of geologic space and/or geologic time. A scenario of boundary locations within a well may refer to a set of potential locations of boundaries within the well. A scenario of boundary locations within a well may be determined based on the subsurface configuration of the well, the subsurface configuration of one or more other wells in the group of wells, and/or other wells. A scenario of boundary locations within a well may refer to and/or may be determined from a correlation scenario between the wells.

The boundary information may define a scenario of boundary locations within the group of wells by including information that describes, delineates, identifies, is associated with, quantifies, reflects, sets forth, and/or otherwise defines one or more of property, quality, attribute, feature, and/or other aspects of the scenario of boundary locations within the well. The boundary information may define a scenario of boundary locations within the group of wells by defining one or more characteristics of the scenario of boundary locations within the group of wells. For example, the boundary information may define a scenario of boundary locations within a well by including information that specifies number and/or locations of boundaries within the well within the scenario of boundary location and/or information that is used to determine number and/or locations of boundaries within the well within the scenario of boundary location. Other types of boundary information are contemplated.

The boundary information may define different scenarios of boundary locations within the group of wells. For a given well within the group of wells, the boundary information may define different scenarios of boundary locations. For example, the scenarios of boundary locations may include a first scenario of boundary locations in which a well includes a first set of boundaries in a first set of locations, a second scenario of boundary locations in which the well includes a second set of boundaries in a second set of locations, and/or other scenarios of boundary locations. Different scenarios of boundary locations may include different numbers and/or different placement of boundary locations within the same well. For example, two scenarios of boundary locations for a well may include different numbers of boundaries for the well. Two scenarios of boundary locations for a well may include different locations of boundaries.

In some implementations, individual scenarios of boundary locations within the group of wells may be determined based on propagation of boundaries of a single well in the group of wells to other wells in the group of wells and/or other information. Use of other correlation techniques to determine scenarios of boundary locations within the group of wells is contemplated.

For example, a single scenario of boundary locations within the group of wells may be determined based on propagation of boundaries of one well in the group of wells to other wells in the group of wells. The well in the group from which the boundaries are propagated to other wells may be referred to as a source well. A single scenario of boundary locations within the group of wells may be determined by identifying boundary locations within the source well, and propagating the boundary locations within the source well to the other wells. The identification and propagation of the boundary locations from the source well to the other wells may be repeated for different wells within the group of wells. For example, each well in the group of wells may be used a source well for separate determination of scenarios of boundary locations within the group of wells.

In some implementations, determination of a scenario of boundary locations within the group of wells may include: (1) identification of boundaries within the source well, (2) generation of branching well paths connecting the group of wells through the source well, where the origin of the branching well paths is located at the source well, (3) identification of shortest paths between the source well and other wells in the group of wells along the branching well paths, (4) alignment of the group of wells along the shortest paths in a global "Relative Geologic Time" (RGT) solution, and (5) propagation of the boundaries of the source well to the aligned group of wells such that the boundaries of the source well are pushed/copied to the wells aligned in the RGT space. Propagation of the boundaries of the source well to the wells aligned in the RGT space may establish correlation between the source well and the other wells. The boundary locations within the wells may be converted from the RGT space to true depth (e.g., in real space/time).

The boundaries within the source well may be identified using one or more analysis of the subsurface configuration of the source well, such as by using CWT. For example, the number and/or location of boundaries in the source well may be identified based on the CWT. The CWT may be performed on a single log for the source well and/or on a suite of logs (multiple logs) for the source well. In some implementations, the number of boundaries that are identified within the source well may be set/adjusted by a user. For instance, the size of blocking windows used in CWT may be automatically adjusted so that a desired number of boundaries are identified within the source well.

Figure 6:
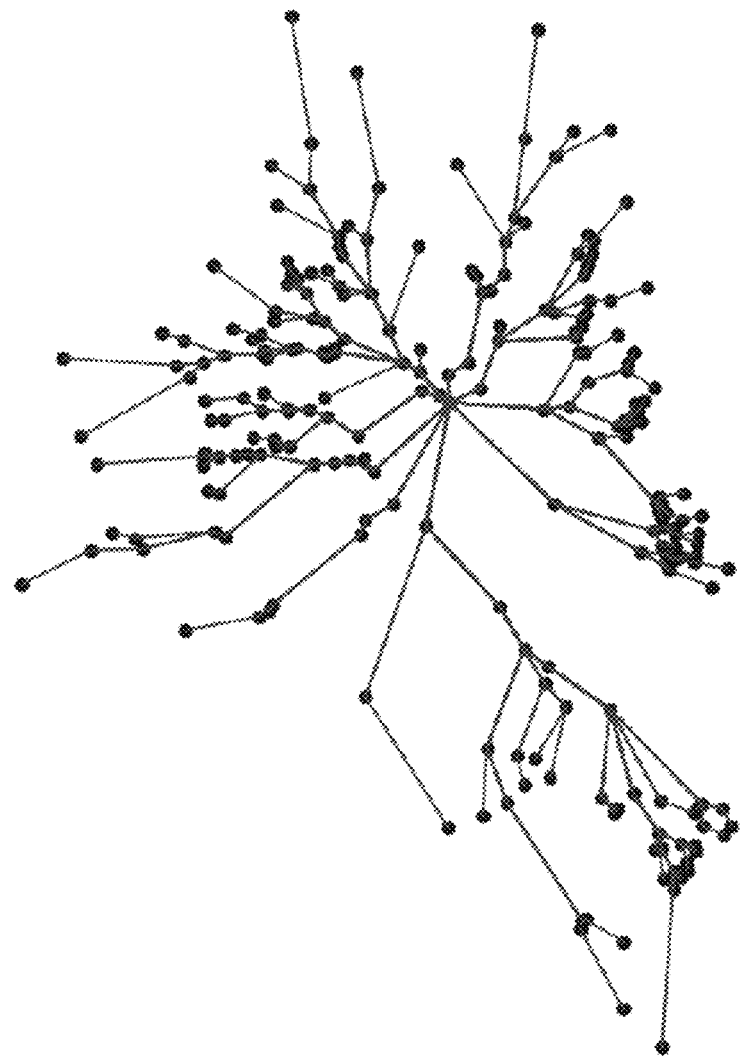
FIG. 6 illustrates example branching well paths connecting a group of wells through a source well.

The branching well paths that connect the group of wells through the source well may be generated by using the source well as the origin. The branching well paths may refer to paths that branches out from the source well to connect the wells in the group of wells. The branching well paths may include paths that traverse through neighboring wells. The branching well paths may be preferentially generated so that they pass through wells in the same locality while suppressing long distance well-pair connections. FIG. 6 illustrates example branching well paths connecting a group of wells through a source well. In FIG. 6, the source well may be located at the centroid position of the group of wells.

The branching well paths may be generated using one or more triangulation techniques, such as Delaunay triangulation, which connect neighboring points while discouraging connections between distance points when intermediate points exist. The branching well paths may be generated based on an outward radial growth from the source well. Other generation of branching well paths is contemplated.

The shortest paths may be identified along the branching well paths. The shortest paths from the source well to other wells in the group of wells may be identified along the branching well paths. A shortest path may refer to a path that starts from the source well and end at another well while having the smallest path of travel.

Alignment of the group of wells along a shortest path may include calculation of relative depth shifts for well pairs along the shortest path. For example, well pairs along a shortest path may be collected and relative depth shifts for individual wells may be calculated using a conjugate gradient optimization method to align the pairs in a global RGT solution. The alignment of the group of wells along a shortest path may result in segments of the wells to be correlated being aligned in the RGT solution. The alignment of the group of wells along a shortest path may result in wells along the shortest path being hung from the same datum and having consistent shifts relative to each other. The wells along the shortest path may be shifted so that they are consistent at all RGT values to create alignment.

Propagation of the boundaries of the source well to the aligned group of wells may include pushing/copying the location of the boundaries in the RGT space to the wells connected along the shortest path. For example, propagation of the boundaries of the source well to the aligned group of wells may include horizontal line/plane extrapolation from the source well to the aligned wells in the RGT space.

The propagation of the boundaries of the source well to the aligned group of wells may establish correlation between the segments of the source well and segments of the aligned group of wells. Adjacent boundaries propagated to the aligned group of wells may define segments of source wells that are correlated with segments of the aligned group of wells.

The aligned group of wells in the RGT space may be converted into spatial/temporal space to identify spatial/temporal location of correlated segments. For example, the propagated boundaries in the RGT space may be converted to true depth (in real space/time) based on the shifts used to align the group of wells (reverse alignment of the group of wells).

Figure 7:
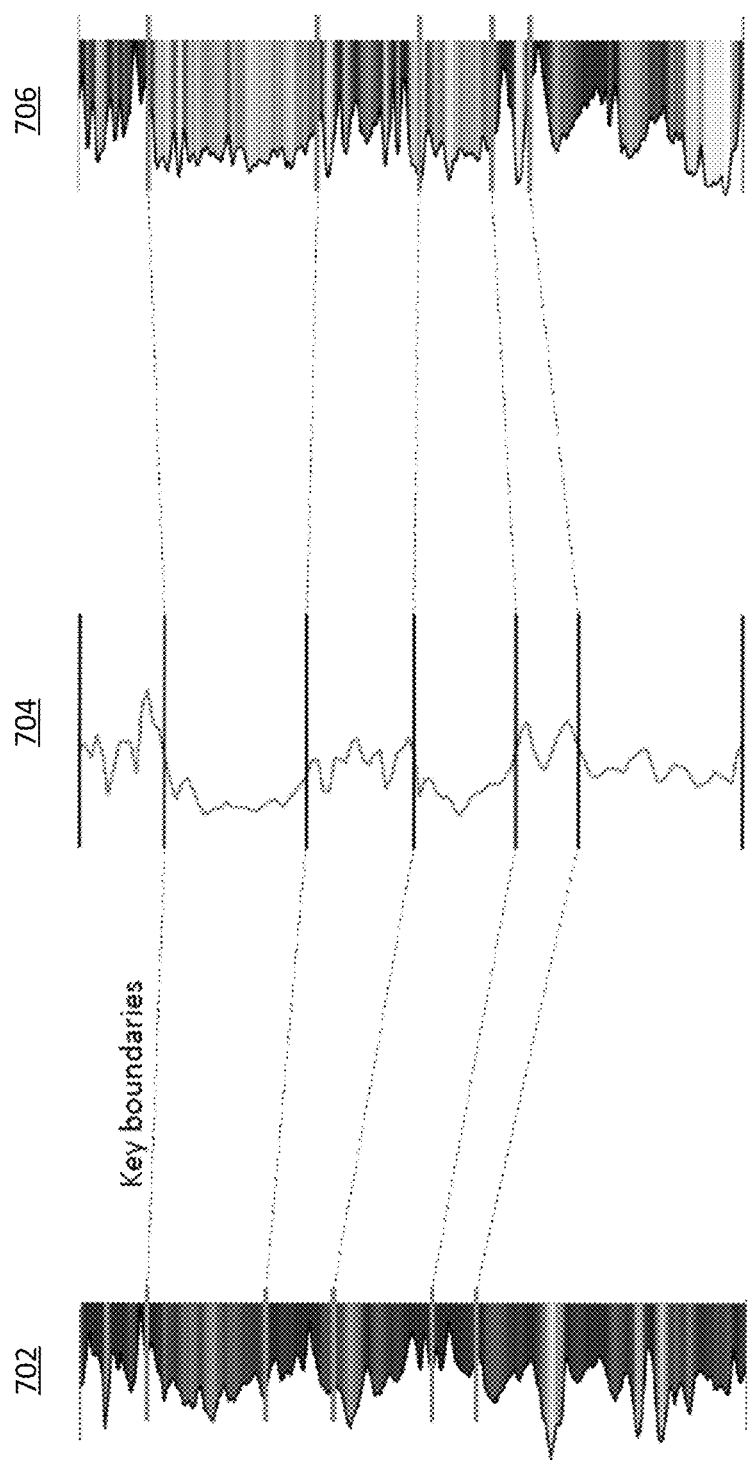
FIG. 7 illustrates an example propagation of boundaries of a source well to other wells.

FIG. 7 illustrates an example propagation of boundaries of a source well to other wells. FIG. 7 may include two wells 702, 706 of a group of wells and a source well 704. The boundaries of the source well 704 may be propagated to the wells 702, 706 to establish correlation between the segments of the source well 704 and segments of the wells 702, 706. Use of the source well 704 to establish correlation between the wells 702, 706 may enable linkage of segments that would not have been connected without the source well 704. For example, the second from the top segments of the wells 702, 706 may be sufficiently different that a regular dynamic time warping analysis would not correlate the two segments. These two segments may be correlated through the second from the top segment of the source well 704. That is, the segment in the wells 702, 706 may be sufficiently similar to the segment in the source well so that they are linked through the segment in the source well. The use of the source well 704 enables correlations to be made between the wells 702, 706 that incorporate awareness of the variations in the subsurface configuration within the region of interest. The use of the source well 704 enables correlation between the wells 702, 706 that incorporates important features of the region of interest through the source well 704.

Figure 8:
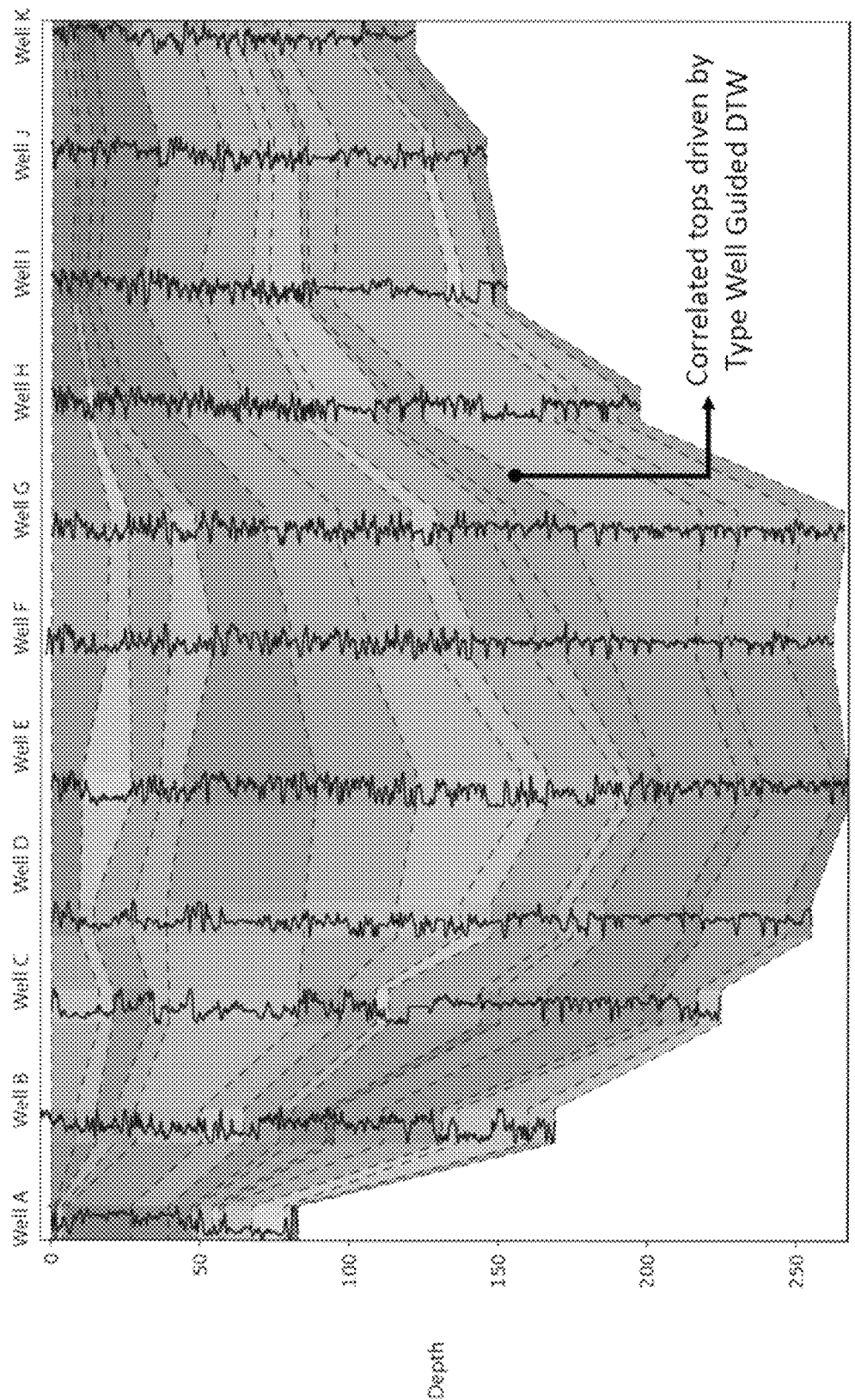
FIG. 8 illustrates an example correlation scenario.

FIG. 8 illustrates an example correlation scenario for a region of interest. The wells shown in FIG. 8 may include wells along a line on branching well paths. The correlation of wells shown in FIG. 8 may be established through use of a source well. Different shading of the well segments may correspond to interpolation of average well log values of the packages between the boundaries. As shown in FIG. 8, segments of wells having varied well log values may be correlated. Correlation of wells with the use of the source well may enable greater understanding of the changes in subsurface configuration of the region of interest and the connectivity between different portions of the region of interest than correlation of wells without the use of source wells.

In some implementations, individual wells in the group of wells may be selected as the source well. A particular well may be selected as the source well to determine correlation between the group of wells. That is, each well in the group of wells may be selected as the source well, with the techniques described herein repeated for different selections of the individual wells. Separate scenarios of correlation may be established for different selections of the individual wells in the group of wells as the source well. Use of different wells in the group of wells as the source well may provide different correlation results between the group of wells. Selection of an individual well in the group of wells as the source well may bias the correlation of wells based on the subsurface configuration/boundaries identified in the individual well.

In some implementations, a pseudo well representative of the region of interest may be selected as the source well. A pseudo well may be referred to as a type well. A pseudo well may refer to a well simulated using multiples wells in the group of wells. A pseudo well may refer to a well that is simulated within the region of interest. A pseudo well may have pseudo (simulated) subsurface configuration, which may be determined based on the subsurface configuration of multiple wells in the group of wells. The subsurface configuration of multiple wells in the group of wells may be combined to generate the pseudo subsurface configuration of the pseudo well. The pseudo subsurface configuration of the pseudo well may be representative of variations of subsurface configuration in the multiple wells.

In some implementations, the pseudo well representative of the region of interest may be generated based on combination of the subsurface configuration of the group of wells and/or other information. Combining the subsurface configuration of the group of wells may include combining the subsurface configuration of some or all the wells in group of wells. In some implementations, the generation of the pseudo well based on the combination of the subsurface configuration of the group of wells may include: (1) connecting the individual wells in the group of wells; (2) determining dynamic time warping paths for individual pairs of the connected wells; (3) determining shifts of the wells; (4) aligning the wells; and (5) combining the subsurface configuration of the aligned wells.

Individual wells in the group of wells may be connected based on a distance threshold and/or other information. Wells that are within the distance threshold (e.g., less than the distance threshold; equal or less than the distance threshold) may be connected. The wells may be connected to form a graph of wells. The graph of wells may include nodes representing the wells and edges representing connections between pairs of wells. The value of the distance threshold (e.g., lateral/geographic distance threshold) may be selected to control the connectivity of wells in the group of wells. Wells that are not within the distance threshold may not be compared/correlated for generation of the pseudo well.

In some implementations, the distance threshold may be manually set (e.g., user-defined value, default value). In some implementations, the distance threshold may be adjusted to minimize number of connections within the group of wells without leaving any well isolated. The value of the distance threshold may be automatically adjusted to the smallest value that results in all wells being connected to at least one other well. In some implementations, the distance threshold may be adjusted to establish at least a minimum (desired) number of connections for the individual wells in the group of wells. The value of the distance threshold may be automatically adjusted so that all wells are connected at least a minimum (desired) number of wells. In some implementations, the distance threshold may be adjusted based on spatial distribution of wells. The distance threshold may be adjusted based on where a well is located within the region of interest and/or based on clustering of wells in the region of interest. Use of other criteria to adjust the value of the distance threshold are contemplated.

Figure 9:
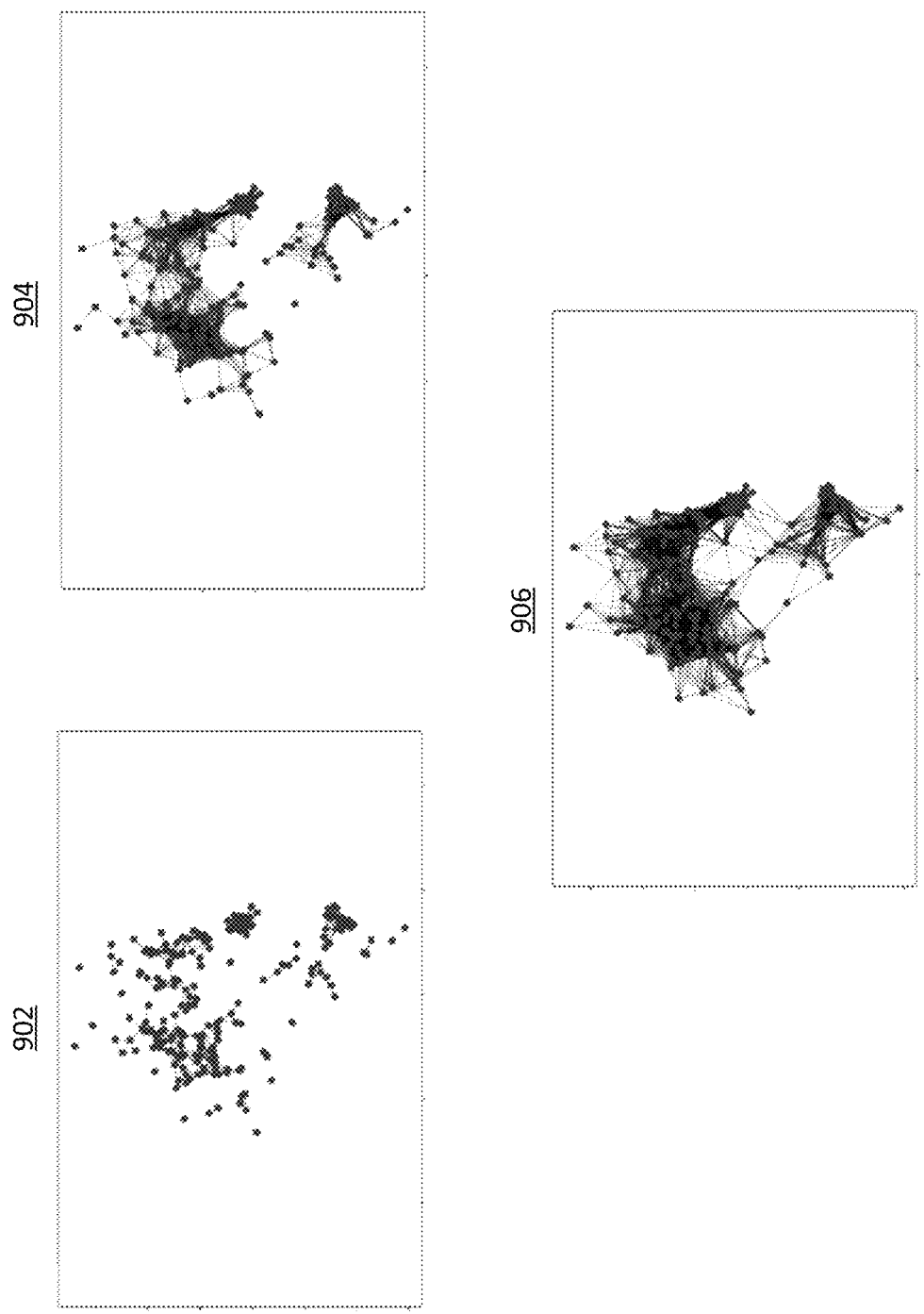
FIG. 9 illustrates example connections between wells at different distance thresholds.

FIG. 9 illustrates example connections between wells. Scenarios 902, 904, 906 may illustrate different connectivity of wells in a group of wells based on different distance thresholds. The distance threshold may be the smallest in the scenario 902 and largest in the scenario 906. In the scenario 902, the (smallest) distance threshold may result in some of the wells being connected and some of the wells being isolated (not connected to any other well). In the scenario 904, the (middle) distance threshold may result in all but one of the wells being connected, and a single well being isolated. In the scenario 906, the (largest) distance threshold may result in all of the wells being connected, with an individual well having connections to more wells than in the scenario 904.

Dynamic time warping paths for individual pairs of the connected wells may be determined based on the well information for the individual wells and/or other information. For example, dynamic time warping paths for individual pairs of the connected wells may be determined based on the normalized well log(s) for the individual wells and/or other information. Dynamic time warping paths may be determined for those wells that have been connected together using the distance threshold. For example, a group of wells including three wells A, B, and C. Based on a distance threshold, wells A and B may be connected, wells B and C may be connected, and wells A and C may be connected. Dynamic time warping paths may be determined for well A-B pair, well B-C well, and well A-C well. Referring to FIG. 9, dynamic time warping paths may be determined for individual edges on the graph of wells.

Figure 10:
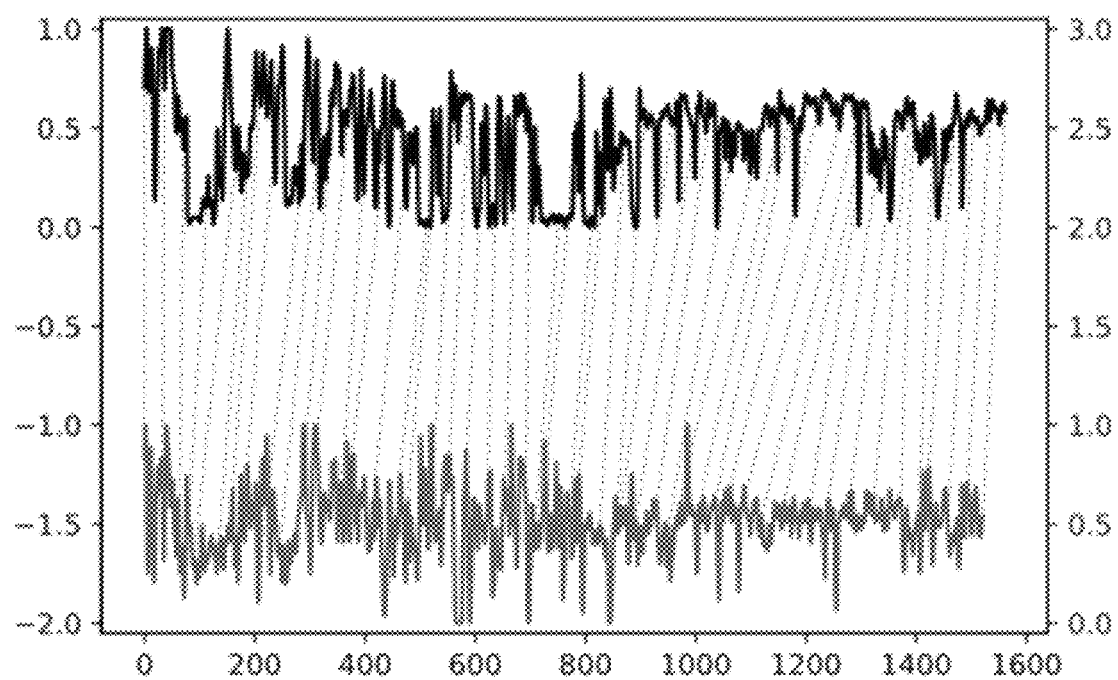
FIG. 10 illustrates an example correlation between two well logs.

In some implementations, the determination of a dynamic time warping path for a well-to-well connection may include calculation of an optimized dynamic time warping path for the well-to-well connection. The optimized dynamic time warp path may include indices that align the corresponding well logs at the least cost. The dynamic time warping path may be used to find the (best) correlation (e.g., best alignment of well logs) between individual pairs of connected wells. FIG. 10 illustrates an example correlation 1000 between two well logs. The correlation 1000 may show values of two well logs, with the lines showing how a point in one well log maps to a point in the other well log.

Shifts of the wells in the group of wells may be determined based on the dynamic time warping paths and/or other information. Determining shifts of the wells may include calculating relative depth shifts for individual wells (relative depth shift for a well to a connected well to align the matching segments from the dynamic time warping paths), and using the relative depth shifts to calculate the absolute depth shift needed to align the wells. In some implementations, the shifts of the wells may be determined using a conjugate gradient optimization method to align all well pairs in a global "Relative Geologic Time" (RGT) solution. The relative shifts calculated from the dynamic time warping paths may be modified into relative geologic time.

The wells in the group of wells may be aligned based on the shifts of the individual wells and/or other information. The wells may be aligned in the RGT solution using the relative shifts calculated from the dynamic time warping paths/absolute shifts calculated from the relative shifts. The alignment of the wells may include shifting of the wells so that correlated segments of the wells are aligned. The conjugate gradient optimization method may take into account shifts for individual pairs of wells to produce a global solution in which all the wells are hung from the same datum and have consistent shifts relative to each other. The wells may be shifted so that they are consistent at all RGT values to create alignment.

The subsurface configuration of the aligned wells may be combined to determine pseudo subsurface configuration of the pseudo well. Combining subsurface configuration of the aligned wells may include uniting, merging, fusing, blending, consolidating, and/or otherwise combining the subsurface configuration of the aligned wells. For example, combining subsurface configuration of the aligned wells may include averaging (e.g., simple averaging, weighted averaging with higher weights given to more representative well log) values of the well logs across the aligned wells. Other combinations of subsurface configuration of the aligned wells are contemplated.

Figure 11:
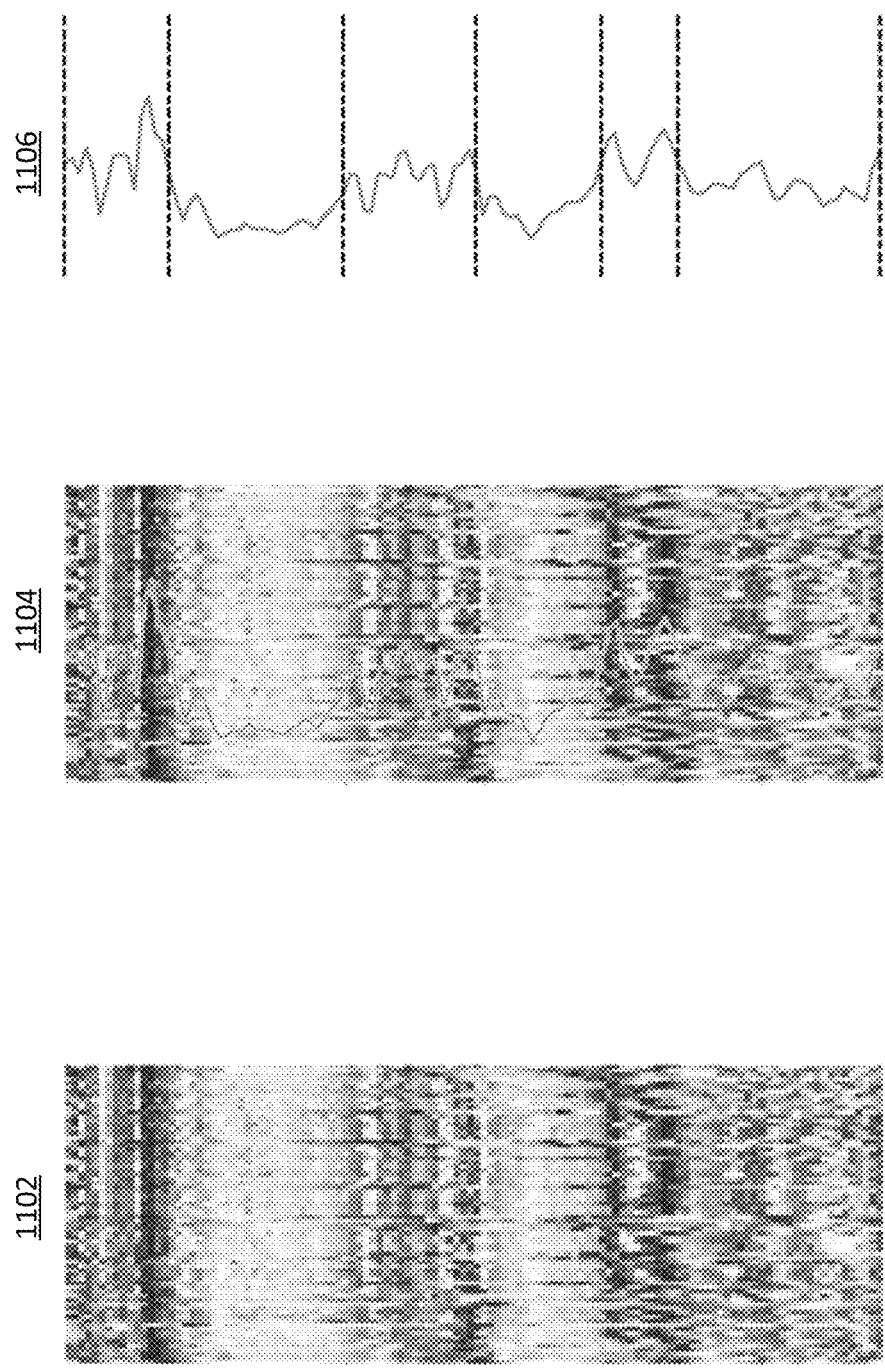
FIG. 11 illustrates example generation of a pseudo well representative of a region of interest.

FIG. 11 illustrates example generation of a pseudo well representative of a region of interest. FIG. 11 includes a chronostratigraphic plot 1102, a pseudo well plot 1104, and a pseudo well boundary plot 1106. The chronostratigraphic plot 1102 may include visual representation of the subsurface configuration (e.g., values of well logs) of aligned wells. Alignment of the wells may include the correlated segments of the wells/well logs being placed adjacent to each other. The subsurface configuration of the aligned wells may be combined across the wells to generate the pseudo well plot 1104. The combination of the subsurface configuration of the aligned wells may preserve key characteristics of the wells while removing irregularities, anomalies, jitter, and/or noise.

The pseudo well plot 1104 may include visual representation of the subsurface configuration of aligned wells and a visual representation of the pseudo subsurface configuration of the pseudo well (e.g., values of a pseudo well log). The pseudo subsurface configuration of the pseudo well may be referred to as a type curve. The pseudo subsurface configuration of the pseudo well may be representative of the region of interest. The pseudo subsurface configuration of the pseudo well may represent important/key characteristics of the wells within the group of wells.

Boundaries in the pseudo well may be identified based on the pseudo subsurface configuration of the pseudo well and/or other information. For example, CWT may be used on the pseudo subsurface configuration (pseudo well log, type curve) to identify number and/or location of boundaries in the pseudo well. Use of other boundary identification techniques are contemplated. The pseudo well boundary plot 1106 may show example locations of boundaries in the pseudo well as dotted lines. Adjacent boundaries may define pseudo segments within the pseudo well. The boundaries in the pseudo well may be used to correlate the wells in the group. Segments in the wells of the well groups may be correlated with the pseudo segments within the pseudo well via propagation of the boundaries in the pseudo well to the other wells.

The pseudo well may be positioned within the region of interest. The position of the pseudo well within the region of interest may be determined manually and/or automatically. For example, the pseudo well may be positioned at a user-specified position within the region of interest. As another example, the pseudo well may be positioned at a centroid position of the group of wells. The centroid position of the group of wells may refer to a position corresponding to the center of mass of the group of wells. For example, the centroid position of the group of wells may be determined to be the average X and average Y wellhead coordinates for all wells in the group of wells. In some implementations, one or more well locations may be weighed differently (e.g., weighed more, less) than other well locations for determination of the centroid position. For example, the locations of wells from which more information/more valuable information/more representative information was retrieved may be weighed more than locations of other wells. Locations of wells in a particular area within the region of interest may be weighted more than locations of wells in other area(s). Other positions of pseudo well within the region of interest are contemplated.

In some implementations, separate scenarios of boundary locations within the group of wells may be determined based variations of the following: (1) the types of well information used in correlating wells (e.g., different types of single logs, different combinations of multiple logs); (2) identification of boundaries within the source well (e.g., number of boundaries identified within the source well, techniques used to identify boundaries within the source well, parameters of techniques used to identify boundaries within the source well, such as Continuous Wavelet Transform scale); (3) types of wells used as source well (e.g., real well, virtual well, pseudo well), (4) wedging tolerance (e.g., stopping boundary identification where stratigraphy wedges/pinches out). Other variations to generate separate scenarios of boundary locations within the group of wells are contemplated.

Figure 12:
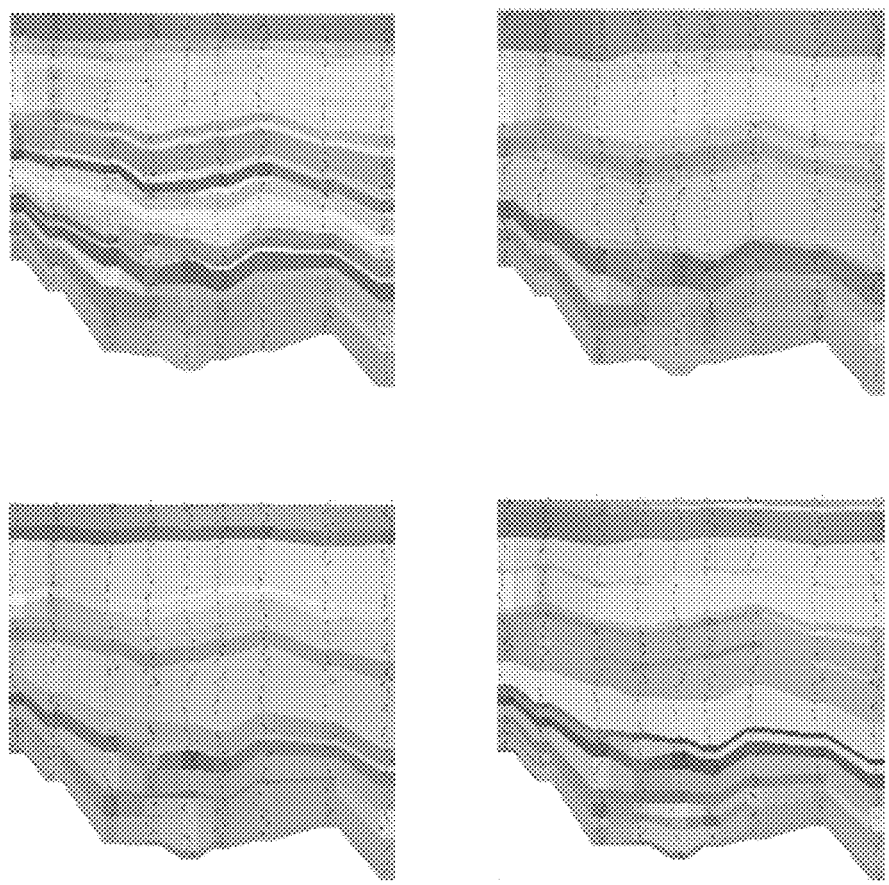
FIG. 12 illustrates different correlation scenarios for a region of interest.

FIG. 12 illustrates four different correlation scenarios for a region of interest. The four different correlation scenarios may include four different scenarios of boundary locations for the wells within the region of interest. Different number and/or locations of boundaries within the different scenarios may result in different correlation between the same wells within the region of interest. Different correlation scenarios may provide different understanding of (1) changes in the subsurface configuration of the region of interest and (2) connectivity between different portions of the region of interest.

Figure 13:
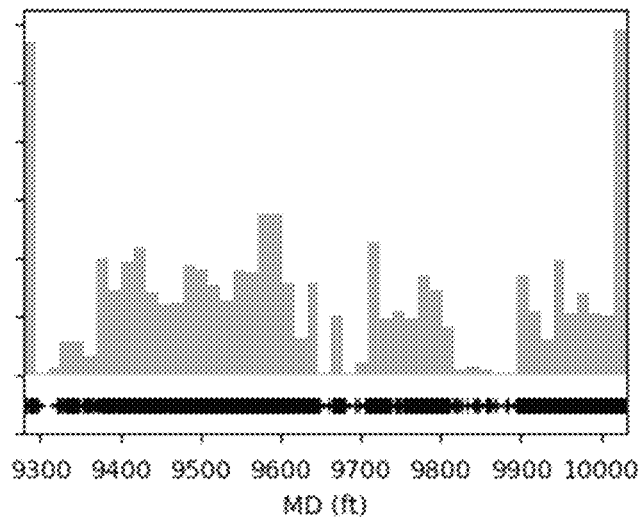
FIG. 13 illustrates an example histogram representation of boundary locations within a well.

FIG. 13 illustrates a histogram representation 1300 of boundary locations within a well. Boundary locations within multiple scenarios of boundary locations for the well may be represented within the histogram representation 1300. All boundary locations within different scenarios of boundary locations may be combined and shown as a histogram. The histogram representation 1300 may show the total number of times a boundary is recognized at different depths across multiple scenarios of boundary locations for the well. As shown within the histogram representation, boundaries may be recognized at certain locations more often than other locations in the multiple scenarios of boundary locations for the well.

The boundary likelihood curve component 106 may be configured to generate one or more boundary likelihood curves for one or more of the multiple wells within the group of wells. A boundary likelihood curve may be generated for some or all of the wells within the group of wells. For example, a boundary likelihood curve may be generated for individual wells within the group of wells. A boundary likelihood curve for a well may refer to a curve that represents the likelihood of a boundary being located at different locations (e.g., in space, in time). The value of the boundary likelihood curve at a particular location may reflect the likelihood of a boundary existing at the particular location.

A boundary likelihood curve for a well may be generated based on the scenarios of boundary locations for the well and/or other information. A boundary likelihood curve for a well may be generated based on the distribution of boundary locations for the well from multiple scenarios of boundary locations for the well. Locations of boundaries in the well from multiple scenarios of boundary locations for the well may be used to generate a boundary likelihood curve for the well. Separate numbers and locations of boundaries from multiple scenarios of boundary locations for a well may be synthetized into a boundary likelihood curve for the well. For example, different numbers of boundaries and/or different locations of boundaries from multiple scenarios of boundary locations for a well may be synthetized into a boundary likelihood curve for the well. A boundary likelihood curve for a well may combine the results of multiple correlation scenarios for the well. Rather than picking one correlation scenario to determine the location of boundaries within the well, multiple correlation scenarios may be combined into a boundary likelihood curve.

In some implementations, a boundary likelihood curve for a well may be generated by converting a histogram representation of boundary locations within the well into the boundary likelihood curve. For example, a moving window may be used to integrate the area under the histogram representation to generate the boundary likelihood curve. Sinusoidal interpolation may be applied to generate the boundary likelihood curve. Interpolation using a spline, piecewise linear, or other types of interpolants may be applied to generate the boundary likelihood curve. A smoothing filter may be applied by convolving a filter with the histogram representation to generate the boundary likelihood curve. One or more machine learning methods may be used to generate the boundary likelihood curve based on the histogram bin heights. Use of other conversion techniques is contemplated.

In some implementations, a boundary likelihood curve for a well may be generated using kernel density estimation. The boundary likelihood curve may be generated as a kernel density curve. Rather than each instance of a boundary location in individual scenarios of boundary locations being turned into a unit value, such as in the histogram representation, each instance of a boundary location may be turned into a kernel (a curve that extends from below the boundary location to above the boundary location, with the maximum at the boundary location) and added up to generate the boundary likelihood curve. Other generation of the boundary likelihood curve is contemplated.

Figure 14:
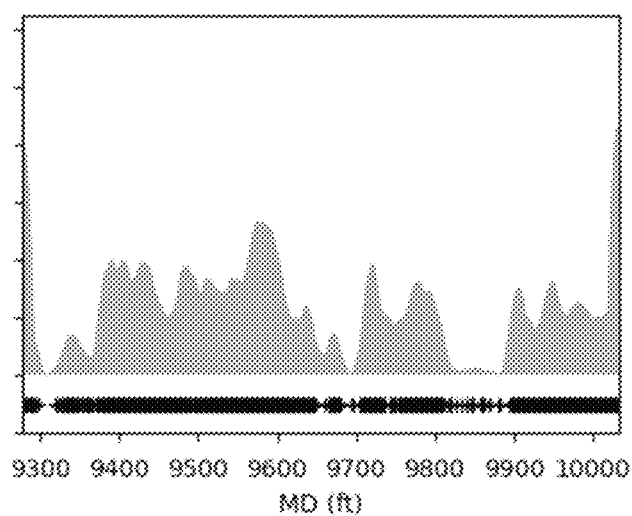
FIG. 14 illustrates an example likelihood curve representation of boundary locations within a well.

FIG. 14 illustrates a likelihood curve representation 1400 of boundary locations within a well. The likelihood curve representation of boundary locations within the well may include a boundary likelihood curve for the well. The boundary likelihood curve shown in FIG. 14 may be generated as a kernel density curve. Different types of kernel (e.g., uniform/tophat, triangle, Epanechnikov, quartic, triweight, Gaussian, cosine) may be used to generate the boundary likelihood curve with different curves. In some implementations, the type of kernel used to generate the boundary likelihood curve may be selected by a user. In some implementations, the type of kernel used to generate the boundary likelihood curve may be selected based on analysis of well information (e.g., well logs), generated boundary likelihood curve, and/or other information.

For example, well logs for a well may be analyzed to identify key interfaces within the well, and the boundary likelihood curve may be compared to determine whether it differentiates those key interfaces from other parts of the well. The type of kernel used to generate the boundary likelihood curve may be changed until the key interfaces are properly differentiated within the boundary likelihood curve. As another example, well logs for a well may be analyzed to identify heterogeneity within the well, and the boundary likelihood curve may be compared to determine whether it represents the heterogeneity within the well. The type of kernel used to generate the boundary likelihood curve may be changed until the heterogeneity is accurately represented within the boundary likelihood curve. As yet another example, a first metric that characterizes the error between the boundary likelihood curve and the histogram representation may be calculated and a second metric that characterizes smoothness of the boundary likelihood curve may be calculated. An increase in one metric may result in decrease in the other metric. The type of kernel used to generate the boundary likelihood curve may be changed until the desired balance is achieved between the two metrics. Use of other factors/criteria to select the kernel type to generate the boundary likelihood curve is contemplated.

The boundary likelihood curve may be generated using a single type of well log or multiple types of well log. For example, analysis of the well for boundary propagation may be performed using multiple types of well logs, and the boundary likelihood curve may be generated to represent combination of boundary scenarios as determined using the multiple types of well logs. As another example, analysis of the well for boundary propagation may be performed using a single type of well logs, and the boundary likelihood curve may be generated to represent combination of boundary scenarios as determined using the type of well logs. Separate boundary likelihood curves may be generated for a well based on separate boundary scenarios determined using separate types of well logs. In some implementations, separate boundary likelihood curves generated using separate types of well logs may be combined into a single boundary likelihood curve. For example, separately boundary likelihood curves may be generated for a well using a gamma ray log and a resistivity log. The separate boundary likelihood curves may be stacked and/or otherwise combined so that a boundary that is recognized by more types of well logs are given higher importance than a boundary that is recognized by fewer types of well logs.

Figure 15A:
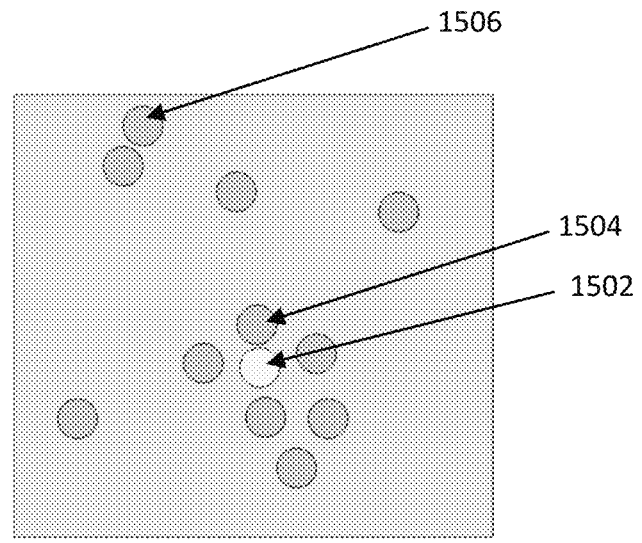
FIG. 15A illustrates example non-weighting of wells for generation of a boundary likelihood curve.

In some implementations, the boundary likelihood curve may be generated as un-weighted kernel density curve. An un-weighted kernel density curve may refer to a kernel density curve in which individual instances of boundary locations from different boundary scenarios are given the same weight. Scenarios of boundary locations from different correlation scenarios may be treated equally in generation of the un-weighted kernel density curve. FIG. 15A illustrates example non-weighting of wells for generation of a boundary likelihood curve. FIG. 15A may show a region of interest with twelve wells. The locations of boundaries within a well 1502 may be determined via propagation of boundaries from other wells to the well 1502. Generation of an un-weighted kernel density curve for the well 1502 may treat boundaries propagated from different wells the same. For example, same weight may be given to boundaries propagated from a well 1504 (closest well) as the boundaries propagated from a well 1506 (farthest well).

Figure 15B:
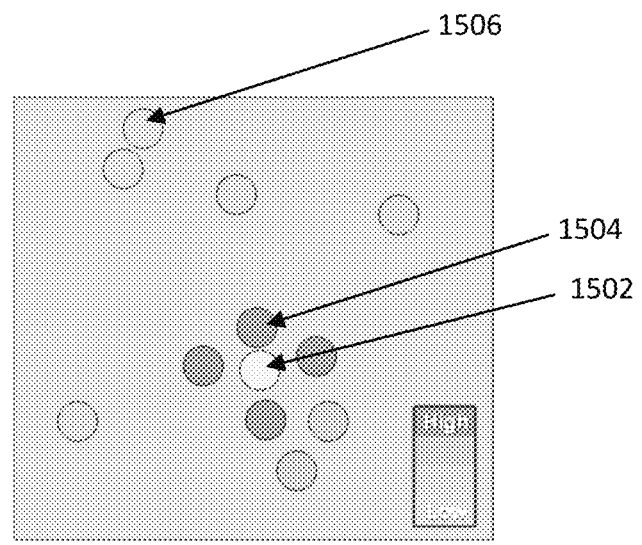
FIG. 15B illustrates example weighting of wells for generation of a boundary likelihood curve.

In some implementations, the boundary likelihood curve may be generated as a weighted kernel density curve. A weighted kernel density curve may refer to a kernel density curve in which individual instances of boundary locations from different boundary scenarios are given separate (e.g., different) weight. Separate weight may be given to different boundary locations based on the source of boundary location and/or other information. Scenarios of boundary locations from different correlation scenarios may be treated differently in generation of the weighted kernel density curve. FIG. 15B illustrates example weighting of wells for generation of a boundary likelihood curve. As in FIG. 15A, the locations of boundaries within the well 1502 may be determined via propagation of boundaries from other wells to the well 1502. Generation of a weighted kernel density curve for the well 1502 may treat boundaries propagated from different wells differently. For example, weight may change based on proximity of the well from which the boundaries are propagated to the well 1502. For instance, higher weight may be given to boundaries propagated from the well 1504 (closest well) than the boundaries propagated from the well 1506 (farthest well). In some implementations, weights may change in reverse so that wells that are closer are given lower weight while wells that are farther away are given higher weight.

Other factors/criteria may be used to determine weights of boundary locations from different boundary scenarios. For example, values of weights may vary based on direction/orientation of the well from which boundaries are propagated, geographic properties of the region of interest (e.g., wells within a particular portion/environment of the region of interest result in higher weight than wells within another portion/environment), number of nodes between the wells along the branching well paths, and/or other information. Use of other factors/criteria to perform weighting is contemplated.

The visual representation component 108 may be configured to generate one or more visual representations of the boundary likelihood curve(s) for the well(s). The visual representation component 108 may be configured to effectuate presentation of the visual representation(s) of the boundary likelihood curve(s) on one or more displays (e.g., the display 14). A visual representation of a boundary likelihood curve may refer to depiction of the boundary likelihood curve in a visual form. A visual representation of a boundary likelihood curve for a well may visually provide information on importance of different locations within the well. A visual representation of a boundary likelihood curve for a well may visually provide information on how many times different locations within the well were identified as having a boundary within different scenarios of boundary locations. A visual representation of a boundary likelihood curve may use different visual characteristics (e.g., different colors, different patterns, different intensity) to convey different information about the boundary likelihood curve. For example, a visual representation of a boundary likelihood curve may use different visual characteristics to convey different magnitudes of the boundary likelihood curve.

A visual representation of a boundary likelihood curve for a well may be generated include visualization of a weighted boundary likelihood curve for the well. A visual representation of a boundary likelihood curve for a well may be generated include visualization of a non-weighted boundary likelihood curve for the well. That is, a visual representation of a boundary likelihood curve for a well may be generated to include either visualization of the weighted or non-weighted boundary likelihood curve for the well. Separate visual representations may be generated for the weighted and non-weighted boundary likelihood curves for the well.

A visual representation of a boundary likelihood curve for a well may be generated include separate visualization of a weighted boundary likelihood curve and an un-weighted boundary likelihood curve for the well. That is, a visual representation of a boundary likelihood curve for a well may be generated to include both visualization of the weighted and non-weighted boundary likelihood curves for the well.

Figure 16A:
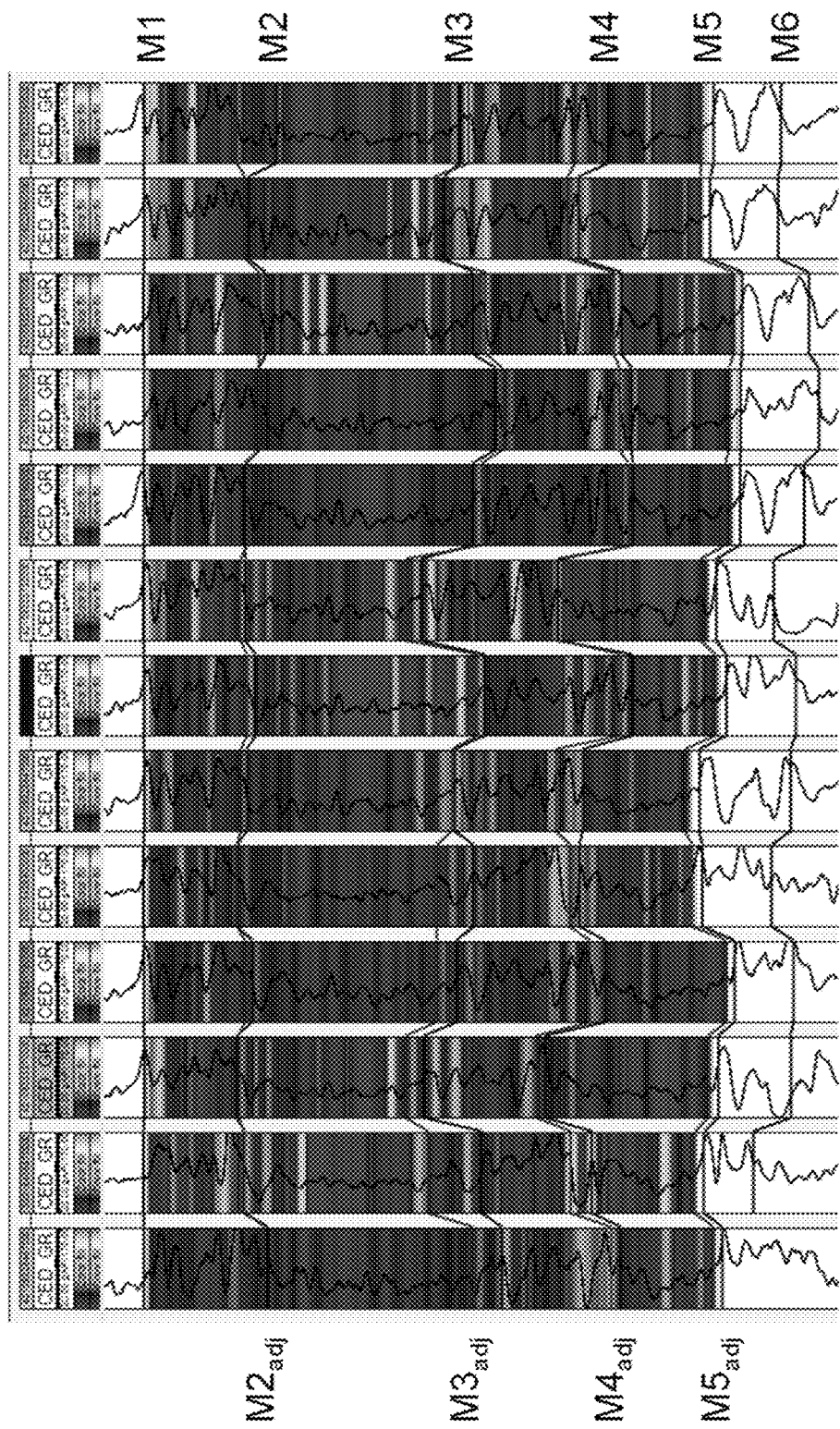
FIG. 16A illustrates an example visual representation of boundary likelihood curves for multiple wells.

FIG. 16A illustrates an example visual representation of boundary likelihood curves for multiple wells. The visual representation of the boundary likelihood curves for the multiple wells may include visual representation of non-weighted boundary likelihood curves for the multiple wells. Individual columns may correspond to different wells. Color/intensity of the visual representation may reflect the magnitude of the boundary likelihood curves.

Figure 16B:
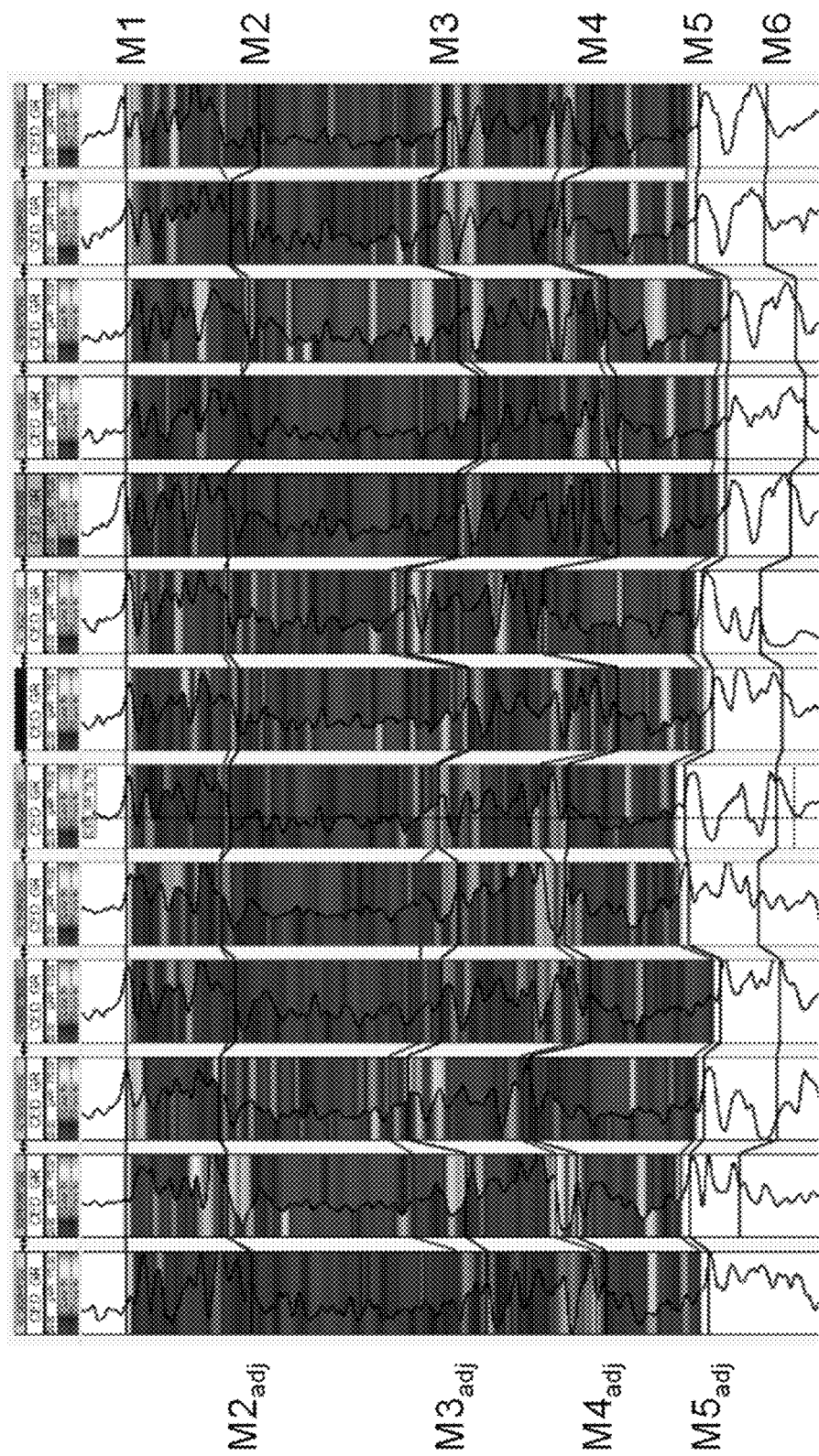
FIG. 16B illustrates an example visual representation of boundary likelihood curves for multiple wells.

FIG. 16B illustrates an example visual representation of boundary likelihood curves for multiple wells. The visual representation of the boundary likelihood curves for the multiple wells may include visual representation of both non-weighted and weighted boundary likelihood curves for the multiple wells. Individual columns may correspond to different wells. The non-weighted representation may be shown on the left side of individual wells while the weighted representation may be shown on the right side of the individual wells. Color/intensity of the visual representation may reflect the magnitude of the boundary likelihood curves.

The visual representation(s) of the boundary likelihood curve(s) for the well(s) may be presented on one or more displays. The visual representation(s) of the boundary likelihood curve(s) for the well(s) may be presented to guide user selection or user adjustment of locations of boundaries within the region of interest. That is, the visual representation(s) of the boundary likelihood curve(s) for the well(s) may be presented to enable user placement of boundary locations within the wells. For example, a user may click on a location along a visual representation to mark a boundary at that location. A user may drag a boundary along the visual representation to change the marking of the boundary location.

A visual representation of a boundary likelihood curve for a well may show how many times/how often a location within the well was recognized as having a boundary in different boundary scenarios. For example, a location in which a boundary was recognized in many different boundary scenarios may indicate that an important feature/surface is present at the location. A visual representation of a boundary likelihood curve for a well may be used to perform interval analysis of the well. For example, an interval of the well in which boundaries were recognized in many different boundary scenarios may indicate presence of relatively heterogenous interval while an interval of the well in which boundaries were not recognized in many different boundary scenarios may indicate presence of relatively homogeneous interval. The magnitude (e.g., peaks/maximums and dips/minimums) and the distribution of magnitudes within the boundary likelihood curve may be visually represented to facilitate a user's understanding of subsurface properties within the wells/region of interest.

The visual representation of the boundary likelihood curve for the well may provide a global perspective on the importance of different segments of the well and how those segments correlate to segments of other wells, as provided by multiple correlation/boundary scenarios. Rather than using a single correlation/boundary scenario to determine subsurface properties within the wells/region of interest, multiple correlation/boundary scenarios may be combined within the visual representation to provide a combined analysis of the subsurface properties within the wells/region of interest.

In some implementations, locations of boundaries within the region of interest may be automatically selected or automatically adjusted based on the boundary likelihood curve(s) and/or other information. For example, the magnitude (e.g., peaks/maximums and dips/minimum) and/or variance of the magnitude of the boundary likelihood curve(s) may be used to automatically mark locations of boundaries within the wells. Magnitude (e.g., peaks/maximums and dips/minimum) and/or variance of the magnitude of the boundary likelihood curve(s) may be used to automatically shift previously marked locations of boundaries within the wells.

For example, referring to FIGS. 16A and 16B, M1, M2, M3, M4, M5, and M6 may indicate originally marked locations of boundaries within thirteen wells. The boundary locations M1, M2, M3, M4, M5, and M6 may have been originally marked using the boundary likelihood curve(s), scenario(s) of boundary locations, and/or other information. For example, the boundary locations M1, M2, M3, M4, M5, and M6 may have been originally marked based on propagation of boundaries from a pseudo well (e.g., type well) representative of the region of interest to the thirteen wells.

The boundary locations $M2_{adj}$, $M3_{adj}$, $M4_{adj}$, and $M5_{adj}$ may indicate boundary markings that have been changed from the original boundary locations M2, M3, M4, and M5. The locations of boundary markings may have been changed manually by a user using the information provided by the visual representations of the boundary likelihood curves shown in FIGS. 16A and/or 16(b). For instance, the user may have selected an original boundary marking and shifted its position down or up using the visual representations of the boundary likelihood curves. The locations of boundary markings may have been changed automatically by a computing device using the boundary likelihood curves. For instance, an original boundary marking may have been shifted down or up to a nearby location (e.g., within a threshold distance/window) with the highest value of the boundary likelihood curve (e.g., the weighted boundary likelihood curve, the un-weighted boundary likelihood curve, both the weighted and unweighted boundary likelihood curves). The locations of boundary markings may be automatically changed by using distance windows relative to a particular boundary/surface (e.g., relative to previously selected and/or preexisting boundary/surface location). Such a change in the visual representation may visually provide information on both (1) where the boundaries were originally marked, and (2) how the boundary markings have been changed based on analysis of boundary location scenarios.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
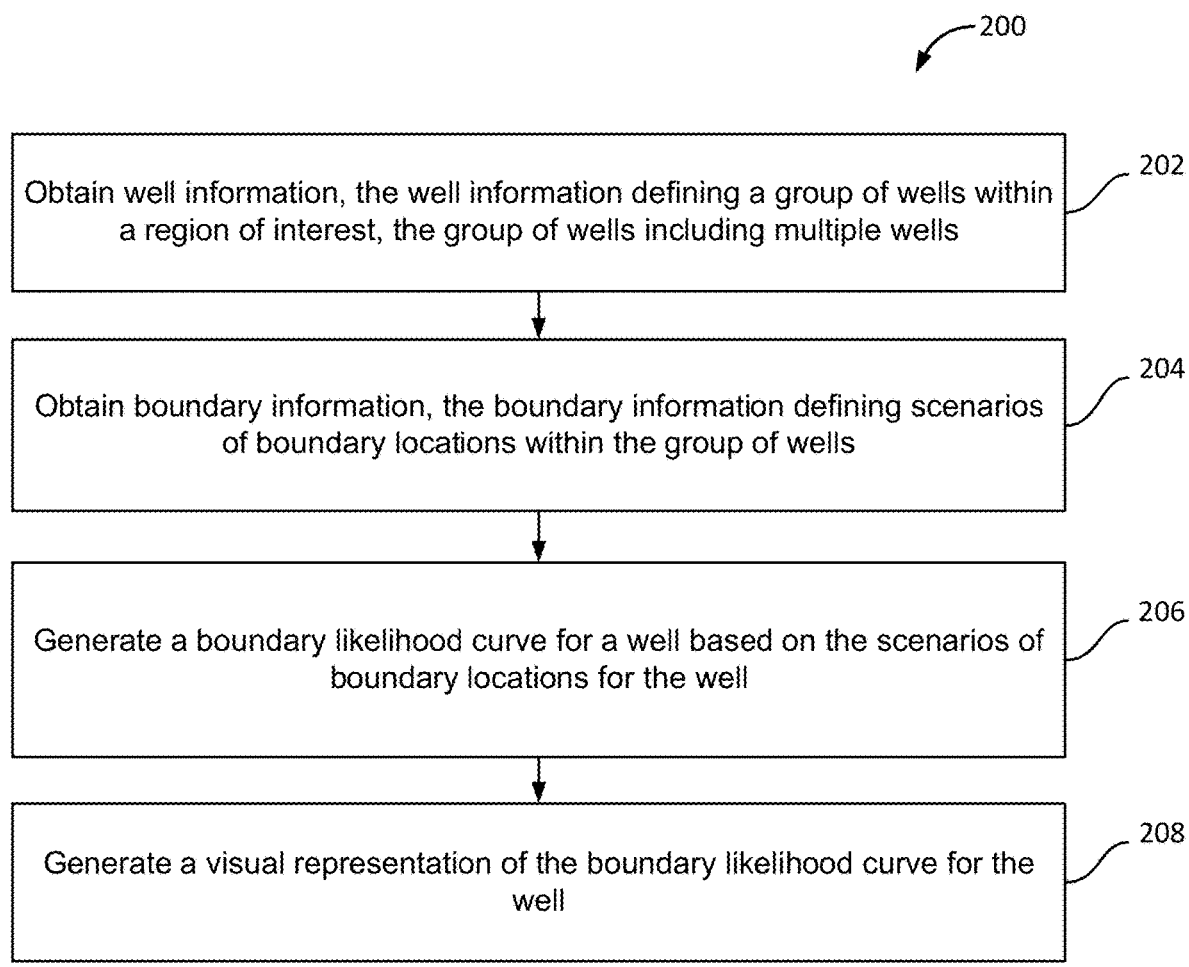
FIG. 2 illustrates an example method for combining multiple scenarios of well boundary locations.

FIG. 2 illustrates method 200 for combining multiple scenarios of well boundary locations. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, well information may be obtained. The well information may define a group of wells within a region of interest. The group of wells may include multiple wells. In some implementation, operation 202 may be performed by a processor component the same as or similar to the well information component 102 (Shown in FIG. 1 and described herein).

At operation 204, boundary information may be obtained. The boundary information may define scenarios of boundary locations within the group of wells. The scenarios of boundary locations may include a first scenario of boundary locations in which a well includes a first set of boundaries in a first set of locations, a second scenario of boundary locations in which the well includes a second set of boundaries in a second set of locations, and/or other scenarios of boundary locations. In some implementation, operation 204 may be performed by a processor component the same as or similar to the boundary information component 104 (Shown in FIG. 1 and described herein).

At operation 206, a boundary likelihood curve for a well may be generated based on the scenarios of boundary locations for the well. In some implementation, operation 206 may be performed by a processor component the same as or similar to the boundary likelihood curve component 106 (Shown in FIG. 1 and described herein).

At operation 208, a visual representation of the boundary likelihood curve for the well may be generated. In some implementation, operation 208 may be performed by a processor component the same as or similar to the visual representation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for combining multiple scenarios of well boundary locations, the system comprising:
one or more physical processors configured by machine-readable instructions to:
obtain well information, the well information defining a group of wells within a region of interest;
obtain boundary information, the boundary information defining different scenarios of boundary locations within the group of wells, individual scenarios of boundary locations generated based on propagation of boundaries of different wells to other wells in the group of wells, the different scenarios of boundary locations including a first scenario of boundary locations in which a given well includes a first set of boundaries in a first set of locations based on propagation of boundaries of a first well to other wells in the group of wells and a second scenario of boundary locations in which the given well includes a second set of boundaries in a second set of locations based on propagation of boundaries of a second well to other wells in the group of wells, the first scenario of boundary locations for the given well different from the second scenario of boundary locations for the given well based on the propagation of boundaries of different wells to other wells in the group of wells;

synthetize the different scenarios of boundary locations within the group of wells into boundary likelihood curves for the group of wells based on distribution of boundary locations in the different scenarios of boundary locations, the boundary likelihood curves including a given boundary likelihood curve for the given well, a value of the given boundary likelihood curve indicating a number of times a corresponding location in the given well was identified as a boundary location in the different scenarios of boundary locations; and generate a visual representation of the boundary likelihood curves for the group of wells, the visual representation of the boundary likelihood curves providing a global perspective on potential boundary locations within the group of wells and connections between different segments of the group of wells within the region of interest.

2. The system of claim 1, wherein:

the first scenario of boundary locations and the second scenario of boundary locations include different numbers of boundaries and different locations of boundaries in the given well based on the propagation of boundaries of the first well and the second well to other wells in the group of wells; and the different numbers of boundaries and the different locations of the boundaries from the first scenario of boundary locations and the second scenario of boundary locations are synthetized into the given boundary likelihood curve for the given well.

3. The system of claim 1, wherein the given boundary likelihood curve is a kernel density curve.

4. The system of claim 3, wherein the kernel density curve is a weighted kernel density curve or an un-weighted kernel density curve.

5. The system of claim 1, wherein the visual representation of the boundary likelihood curves includes:

multiple columns for multiples wells in the group of wells;

the boundary likelihood curves for the multiple wells in the group of wells, the boundary likelihood curves included within the multiple columns for the multiple wells, wherein the given boundary likelihood curve for the given well is included within a given column for the given well, further wherein a visual characteristic of the given column changes within the given column to reflect changes in magnitude of the given boundary likelihood curve;

markers for original locations of boundaries within the multiple wells, wherein the markers for original location boundaries within the multiple wells are moveable by a user, wherein the markers for original location boundaries within the multiple wells include a given marker for an original location of a boundary within the given well; and markers for adjusted locations of boundaries within the multiple wells, wherein the markers for adjusted locations of boundaries within the multiple wells include a given marker for an adjusted location of the boundary within the given well based on user interaction that moves the given marker for the original location of the boundary within the given well.

6. The system of claim 1, wherein original locations of boundaries within the multiple wells are determined based on the boundary likelihood curves for the multiple wells.

7. The system of claim 1, wherein the visual representation of the given boundary likelihood curve for the given well includes separate visualization of a weighted boundary likelihood curve and an un-weighted boundary likelihood curve.

8. The system of claim 1, wherein the propagation of boundaries of different wells to other wells in the group of wells establishes different correlations between well segments in the group of wells.

9. The system of claim 1, wherein a pseudo scenario of boundary locations is generated based on propagation of boundaries of a pseudo well representative of the region of interest to other wells in the group of wells.

10. The system of claim 9, wherein original locations of boundaries within the multiple wells are determined based on the pseudo scenario of boundary locations generated based on the propagation of boundaries of the pseudo well representative of the region of interest to other wells in the group of wells.

11. A method for combining multiple scenarios of well boundary locations, the method comprising:

obtaining well information, the well information defining a group of wells within a region of interest;

obtaining boundary information, the boundary information defining different scenarios of boundary locations within the group of wells, individual scenarios of boundary locations generated based on propagation of boundaries of different wells to other wells in the group of wells, the different scenarios of boundary locations including a first scenario of boundary locations in which a given well includes a first set of boundaries in a first set of locations based on propagation of boundaries of a first well to other wells in the group of wells and a second scenario of boundary locations in which the given well includes a second set of boundaries in a second set of locations based on propagation of boundaries of a second well to other wells in the group of wells, the first scenario of boundary locations for the given well different from the second scenario of boundary locations for the given well based on the propagation of boundaries of different wells to other wells in the group of wells;

synthetizing the different scenarios of boundary locations within the group of wells into boundary likelihood curves for the group of wells based on distribution of boundary locations in the different scenarios of boundary locations, the boundary likelihood curves including a given boundary likelihood curve for the given well, a value of the given boundary likelihood curve indicating a number of times a corresponding location in the given well was identified as a boundary location in the different scenarios of boundary locations; and generating a visual representation of the boundary likelihood curves for the group of wells, the visual representation of the boundary likelihood curves providing a global perspective on potential boundary locations within the group of wells and connections between different segments of the group of wells within the region of interest.

12. The method of claim 11, wherein:

the first scenario of boundary locations and the second scenario of boundary locations include different numbers of boundaries and different locations of boundaries in the given well based on the propagation of boundaries of the first well and the second well to other wells in the group of wells; and the different numbers of boundaries and the different locations of the boundaries from the first scenario of boundary locations and the second scenario of boundary locations are synthetized into the given boundary likelihood curve for the given well.

13. The method of claim 11, wherein the given boundary likelihood curve is a kernel density curve.

14. The method of claim 13, wherein the kernel density curve is a weighted kernel density curve or an un-weighted kernel density curve.

15. The method of claim 11, wherein the visual representation of the boundary likelihood curves includes:

multiple columns for multiples wells in the group of wells;

the boundary likelihood curves for the multiple wells in the group of wells, the boundary likelihood curves included within the multiple columns for the multiple wells, wherein the given boundary likelihood curve for the given well is included within a given column for the given well, further wherein a visual characteristic of the given column changes within the given column to reflect changes in magnitude of the given boundary likelihood curve;

markers for original locations of boundaries within the multiple wells, wherein the markers for original location boundaries within the multiple wells are moveable by a user, wherein the markers for original location boundaries within the multiple wells include a given marker for an original location of a boundary within the given well; and markers for adjusted locations of boundaries within the multiple wells, wherein the markers for adjusted locations of boundaries within the multiple wells include a given marker for an adjusted location of the boundary within the given well based on user interaction that moves the given marker for the original location of the boundary within the given well.

16. The method of claim 11, wherein original locations of boundaries within the multiple wells are determined based on the boundary likelihood curves for the multiple wells.

17. The method of claim 11, wherein the visual representation of the given boundary likelihood curve for the given well includes separate visualization of a weighted boundary likelihood curve and an un-weighted boundary likelihood curve.

18. The method of claim 11, wherein the propagation of boundaries of different wells to other wells in the group of wells establishes different correlations between well segments in the group of wells.

19. The method of claim 11, wherein a pseudo scenario of boundary locations is generated based on propagation of boundaries of a pseudo well representative of the region of interest to other wells in the group of wells.

20. The method of claim 19, wherein original locations of boundaries within the multiple wells are determined based on the pseudo scenario of boundary locations generated based on the propagation of boundaries of the pseudo well representative of the region of interest to other wells in the group of wells.

* * * * *